US012609255B2

(12) United States Patent
Chung

(10) Patent No.: US 12,609,255 B2
(45) Date of Patent: Apr. 21, 2026

(54) BREAKER UNIT AND AIR CIRCUIT BREAKER COMPRISING SAME

(71) Applicant: LS ELECTRIC CO., LTD., Anyang-si (KR)

(72) Inventor: Han Baek Chung, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 281 days.

(21) Appl. No.: 18/286,331

(22) PCT Filed: Apr. 22, 2022

(86) PCT No.: PCT/KR2022/005789
§ 371 (c)(1),
(2) Date: Oct. 10, 2023

(87) PCT Pub. No.: WO2022/234989
PCT Pub. Date: Nov. 10, 2022

(65) Prior Publication Data

US 2024/0212953 A1 Jun. 27, 2024

(30) Foreign Application Priority Data

May 6, 2021 (KR) ........................ 10-2021-0058706
May 14, 2021 (KR) ........................ 10-2021-0062895

(51) Int. Cl.
*H01H 33/10* (2006.01)

(52) U.S. Cl.
CPC .................................. *H01H 33/10* (2013.01)

(58) Field of Classification Search
CPC .......... H01H 9/38; H01H 9/345; H01H 9/346; H01H 9/36; H01H 9/383; H01H 9/386;
(Continued)

(56) References Cited

U.S. PATENT DOCUMENTS 3,585,329 A * 6/1971 Walker .................. H01H 9/383
218/15
4,618,751 A * 10/1986 Wehr ...................... H01H 9/36
218/151

(Continued)

FOREIGN PATENT DOCUMENTS

CN 107578938 * 8/2020 .............. H01H 9/00
EP 2820665 B1 7/2016

(Continued)

OTHER PUBLICATIONS

Translation of CN107578938 (Original document published Aug. 28, 2020) (Year: 2020).*

(Continued)

*Primary Examiner* — William A Bolton
(74) *Attorney, Agent, or Firm* — K&L Gates LLP

(57) ABSTRACT

The present disclosure relates to a circuit breaking unit and an air circuit breaker including the same, and provides a circuit breaking unit, including: a fixed contact; a movable contact moved in a direction toward or away from the fixed contact; a fixed contact terminal having the fixed contact disposed at a lower end thereof and extending upward; a low runner disposed extending upward from the fixed contact, one end thereof coupled to the fixed contact terminal, and the other end thereof spaced apart from the fixed contact terminal; and a magnet unit disposed between the low runner and the fixed contact terminal and forming a magnetic field between the fixed contact and the movable contact to guide a path of an arc generated when the fixed contact and the movable contact are separated, to the outside.

23 Claims, 32 Drawing Sheets

(58) Field of Classification Search
CPC ............ H01H 9/44; H01H 9/46; H01H 9/443; H01H 31/02; H01H 33/04; H01H 33/08; H01H 33/10; H01H 73/18
USPC ....... 218/104, 14, 15, 17, 18, 21–24, 26, 34, 218/36, 38, 40, 43
See application file for complete search history.

(56) References Cited

U.S. PATENT DOCUMENTS

| | | | | |
|---|---|---|---|---|
| 5,223,681 | A * | 6/1993 | Buehler | H01H 71/504 335/201 |
| 5,694,098 | A * | 12/1997 | Mody | H01H 77/108 335/16 |
| 6,281,459 | B1 * | 8/2001 | Munsch | H01H 77/108 335/147 |
| 8,884,728 | B2 * | 11/2014 | Jang | H01H 3/00 335/201 |
| 9,653,237 | B1 * | 5/2017 | Zhou | H01H 77/108 |
| 9,673,004 | B1 * | 6/2017 | Ruempler | H01H 9/36 |
| 9,767,980 | B2 * | 9/2017 | Stifter, Jr. | H01H 71/10 |
| 9,805,887 | B2 * | 10/2017 | Ferree | H01H 9/40 |
| 2020/0357585 | A1 | 11/2020 | Domejean et al. | |
| 2020/0411259 | A1 | 12/2020 | Loos et al. | |
| 2021/0020397 | A1 * | 1/2021 | Oh | H01H 73/18 |

FOREIGN PATENT DOCUMENTS

| | | | |
|---|---|---|---|
| FR | 2632772 | A1 | 12/1989 |
| JP | 2016201171 | A | 12/2016 |
| KR | 101352912 | B1 | 1/2014 |
| KR | 20140091934 | A | 7/2014 |
| KR | 20140110945 | A | 9/2014 |
| KR | 20210007390 | A | 1/2021 |

OTHER PUBLICATIONS

Translation of FR2632772 (Original document published Dec. 15, 1989) (Year: 1989).*
Extended European Search Report for related European Application No. 22799034.8; action dated May 20, 2025; (15 pages).
International Search Report for related International Application No. PCT/KR2022/005789; action dated Nov. 10, 2022; (2 pages).
Written Opinion for related International Application No. PCT/KR2022/005789; action dated Nov. 10, 2022; (5 pages).

* cited by examiner (a)

(b)

BREAKER UNIT AND AIR CIRCUIT BREAKER COMPRISING SAME

CROSS-REFERENCE TO RELATED APPLICATION

This application is a National Stage of International Application No. PCT/KR2022/005789, filed on Apr. 22, 2022, which claims priority to and the benefit of Korean Patent Application No. 10-2021-0058706, filed on May 6, 2021, and Korean Patent Application No. 10-2021-0062895, filed May 14, 2021, the disclosures of which is incorporated herein by reference in its entirety.

FIELD

The present disclosure relates to a circuit breaking unit and an air circuit breaker including the same, and more particularly, to a circuit breaking unit capable of effectively extinguishing an arc generated by breaking an electric current and an air circuit breaker including the same.

BACKGROUND

A circuit breaker refers to a device capable of allowing or blocking energization with the outside by contacting and separating fixed contacts and movable contacts. A fixed contact and a movable contact provided in the circuit breaker are respectively connected energizably to an external power source or load.

The movable contact is movably provided in the circuit breaker. The movable contact can be moved towards or away from the fixed contact. When the movable contact and the fixed contact come into contact to each other, the circuit breaker may be energizably connected to an external power source or load.

When an overcurrent or abnormal current flows in the circuit breaker, the movable contact and the fixed contact in contact are spaced apart from each other. In this case, the current energized between the movable contact and the fixed contact does not immediately disappear, but changes into an arc form and extends along the movable contact.

An arc can be defined as a flow of electrons at high temperature and high pressure. Therefore, when the generated arc stays in the inner space of the circuit breaker for a long time, there is a concern that each component of the circuit breaker may be damaged. In addition, when the arc is discharged to the outside of the circuit breaker without a separate treatment process, there is a risk of injury to the user.

Accordingly, circuit breakers are generally provided with an extinguishing device for extinguishing and discharging an arc. The generated arc passes through the extinguishing device, the arc pressure is increased, the moving speed is increased, and it is cooled at the same time and can be discharged to the outside.

Therefore, the generated arc must be quickly guided to an arc extinguishing device.

However, in the case of a direct current air circuit breaker in which a small current flows among DC air breakers, the power of the generated arc is relatively weak. In addition, in the case of direct current, because zero point does not exist in the current, arc extinguishing is more difficult than that of alternating current.

In particular, since the power of the arc generated inside the DC air circuit breaker is relatively weak when a small current is broken, there is a problem in that the arc generated after the break is not moved to the grid of the arc extinguishing unit. The arc that has not been extinguished in this way stays adjacent to the movable contact and the fixed contact, causing problems such as melting the contact.

Therefore, it is necessary to consider effectively extinguishing the arc generated when the small current is broken in the DC air circuit breaker.

SUMMARY

The present disclosure is directed to providing a circuit breaking unit having a structure capable of solving the above problems and an air circuit breaker including the same.

First, the present disclosure is directed to providing a circuit breaking unit having a structure capable of quickly extinguishing and moving a generated arc and an air circuit breaker including the same.

In addition, the present disclosure is directed to providing an arc extinguishing unit having a structure in which an arc generated when a small current is broken in a direct current circuit breaker can quickly move to a grid and be extinguished, and an air circuit breaker including the same.

In addition, the present disclosure is directed to providing a circuit breaking unit having a structure in which a magnet and a ferromagnetic body forming a magnetic field associated with an arc movement path are not damaged by an arc, and an air circuit breaker including the same.

In addition, the present disclosure is directed to providing a circuit breaking unit having a structure that does not require excessive design changes in order to have a magnet and a ferromagnetic body that form a magnetic field associated with an arc movement path, and an air circuit breaker including the same.

In addition, the present disclosure is directed to providing a circuit breaking unit having a structure in which even when a magnet and a ferromagnetic body forming a magnetic field associated with an arc movement path are provided, a space occupied by the magnet and the ferromagnetic body is not excessively increased, and an air circuit breaker including the same.

In addition, the present disclosure is directed to providing a circuit breaking unit having a structure in which an arc extinguishing path of a generated arc can be secured even when a magnet and a ferromagnetic body are provided, and an air circuit breaker including the same.

In order to achieve the above objects, the present disclosure provides a circuit breaking unit, including: a fixed contact; a movable contact moved in a direction toward or away from the fixed contact; a fixed contact terminal having the fixed contact disposed at a lower end thereof and extending upward; a low runner disposed extending upward from the fixed contact, one end thereof coupled to the fixed contact terminal, and the other end thereof spaced apart from the fixed contact terminal; and a magnet unit disposed between the low runner and the fixed contact terminal and forming a magnetic field between the fixed contact and the movable contact to guide a path of an arc generated when the fixed contact and the movable contact are separated, to the outside.

In addition, the low runner may be formed such that a distance away from the fixed contact terminal becomes longer as the low runner goes upward.

In addition, the low runner may include a bent part formed between both ends and configured to change an angle between the low runner and the fixed contact terminal.

In addition, the shape of the magnet unit may be such that it fills a space formed between the low runner and the fixed contact terminal.

In addition, the magnet unit may include a plurality of magnets segmented into a plurality of segments, and the plurality of magnets may be formed by stacking them in a horizontal or vertical direction.

In addition, the magnet unit may include a first surface magnetized to the N pole and a second surface magnetized to the S pole disposed on opposite surfaces to each other, and the first surface may be disposed in a direction adjacent to the fixed contact.

In addition, the magnet unit may protrude and extend toward at least one direction among both side directions of the low runner.

In addition, the magnet unit may protrude and extend from the rear surface of the low runner toward the movable contact.

In addition, the magnet unit may further include a magnet disposed on the rear surface of the low runner; and an insulating part disposed to surround an exposed surface between the magnet and the low runner.

In addition, the fixed contact terminal may extend upward to form a predetermined angle toward the low runner.

In addition, the circuit breaking unit may further include a movable contact terminal on which the movable contact is disposed, and comprising an extension part in which at least a portion of the area extends upward; and a protruding contact spaced apart from the movable contact and disposed on the extension part.

In addition, the protruding contact may be in contact with the low runner when the movable contact is disposed in a state of being in contact with the fixed contact.

In addition, the present disclosure provides an air circuit breaker, including: an arc extinguishing unit comprising a plurality of side plates and a grid coupled between the side plates; and a circuit breaking unit disposed adjacent to the arc extinguishing unit, wherein the circuit breaking unit includes: a fixed contact; a movable contact moved in a direction toward or away from the fixed contact; a fixed contact terminal having the fixed contact disposed at a lower end thereof and extending upward; a low runner disposed extending upward from the fixed contact, one end thereof coupled to the fixed contact terminal, and the other end thereof spaced apart from the fixed contact terminal; and a magnet unit disposed between the low runner and the fixed contact terminal and forming a magnetic field between the fixed contact and the movable contact to guide a path of an arc generated when the fixed contact and the movable contact are separated, to the outside.

In addition, the grid may extend to have a length corresponding to a central portion of the magnet unit.

In addition, the grid may include a grid leg extending downward from both ends in the width direction so that an induced magnetic field can be formed by an arc generated when a fixed contact and a movable contact are spaced apart.

In addition, the grid leg may extend adjacent to an end of the side plate.

In addition, the grid leg may include a first grid leg extending from one end of the grid in the width direction, and a second grid leg extending opposite the first grid leg, and the first grid leg and the second grid leg may have the same width.

In addition, the air circuit breaker may further include a protruding contact extending upward from the movable contact, and the grid leg may be formed to surround the protruding contact from both sides.

In addition, the first grid leg and the second grid leg may have a width greater than a length of an air gap which is a distance between the first grid leg or the second grid leg and the protruding contact.

In addition, the low runner may be formed such that a distance away from the fixed contact terminal becomes longer as the low runner goes upward.

In addition, the shape of the magnet unit may be such that it fills a space formed between the low runner and the fixed contact terminal.

In addition, the magnet unit may include a first surface magnetized to the N pole and a second surface magnetized to the S pole disposed on opposite surfaces to each other, and the first surface may be disposed in a direction adjacent to the fixed contact.

In addition, the fixed contact terminal may extend upward to form a predetermined angle toward the low runner.

In addition, in a trip state in which the fixed contact and the movable contact are spaced apart, a magnetic field area in which electromagnetic force is applied to a generated arc may be formed in a space between the low runner and the movable contact and in a space below the grid.

In addition, a magnetic field by the magnet unit and an induced magnetic field by the grid leg induced by a generated arc may be applied to the magnetic field area.

According to embodiments of the present disclosure, the following effects can be achieved.

First, a magnet unit is provided in the circuit breaking unit. The arc generated when the fixed contact and the movable contact are separated receives an electromagnetic force directed toward the grid by a magnetic field formed by the magnet unit. Accordingly, the path of the arc is formed in a direction in which the arc is discharged to the outside through the grid and the arc extinguishing unit at the fixed contact and the movable contact. Accordingly, the generated arc can be quickly extinguished and moved.

In addition, according to an embodiment of the present disclosure, an arc-guided path A.P., which is to move the arc in a left or right direction depending on the current flow of the arc, is formed by a magnetic field formed by the magnet unit, so that the arc can be more quickly applied to the grid of the arc extinguishing unit.

In addition, since the electromagnetic force received by the arc due to the magnetic field formed by the magnet unit is applied to the arc in a direction directed toward the grid of the arc extinguishing unit regardless of the current flow direction of the arc, there is an advantage in that it is possible to quickly extinguish the arc regardless of the current flow direction of the arc.

In addition, an insulating part is provided in the magnet unit. The magnet is sealed by the insulating part, and communication with the outside is cut off. Therefore, the magnet is not exposed to the inner space of the air circuit breaker where the arc flows. Accordingly, the magnet may not be damaged by the heat or pressure of the generated arc.

The magnet unit is disposed in a space between the fixed contact terminal and the low runner. Therefore, in order to provide a magnet for forming a magnetic field, design changes in other components and arrangements of the air circuit breaker are not required.

Furthermore, the magnet is placed adjacent to the starting point where the arc is generated. Therefore, it is possible to quickly extinguish an arc when an arc is generated.

Due to the magnetic field formed by the magnet unit, the generated arc can flow toward the grid. Thus, an extinguishing path of the generated arc can be secured.

In addition, the present disclosure provides a protruding contact and a low runner that are in contact with each other in a state in which a fixed contact and a movable contact are spaced apart in the first state of the trip state, and a protruding contact and a low runner that are spaced apart in the second state, and thus generates an arc closer to a grid when a small current breaking occurs in a DC air circuit breaker. Accordingly, there is an advantage in that the generated arc is more easily applied and extinguished through the grid.

In addition, according to the present disclosure, an air gap can be formed between the protruding contact and the grid leg. Since the air gap increases the pressure in the arc-generation area, the generated arc can be subjected to a rising force. Accordingly, the arc can be more easily applied to the grid or the grid leg and extinguished quickly.

DETAILED DESCRIPTION

Hereinafter, an air circuit breaker according to an embodiment of the present disclosure will be described in detail with reference to the accompanying drawings. In the following description, in order to clarify the features of the present disclosure, descriptions of some components may be omitted.

1. Term Definition

The term "energization" used in the following description means that a current or an electrical signal is transmitted between one or more members.

The term "magnet" used in the following description refers to any object capable of magnetizing a magnetic body or generating a magnetic field. In an embodiment, the magnet may be provided as a permanent magnet or an electromagnet.

The term "air circuit breaker" used in the following description refers to a circuit breaker configured to extinguish an arc using air or compressed air. It is assumed that each configuration described below is applied to an air circuit breaker.

However, each configuration described below may also be applied to an air-blast circuit breaker, a compressed air circuit breaker, a gas circuit breaker, an oil circuit breaker, a vacuum circuit breaker, and the like.

The term "magnetic field (M.F)" used in the following description means a magnetic field formed by a magnet. Alternatively, it means a magnetic field formed by a plurality of magnets disposed adjacent to each other. That is, the magnetic field (M.F) means a magnetic field formed by one magnet or a plurality of magnets.

The term "magnetic field area (M.F.A)" means an area of a magnetic field formed by a magnet or the like. In particular, it means a place where a magnetic field formed by a magnet or a magnetized magnetic body affects a section where an arc is generated.

The "arc-generation area (A.A)" means an area where an arc is generated. It means an area where arcing is likely to occur when a movable contact and a fixed contact are spaced apart, and in particular, it means an area where arcing is likely to occur when a protruding contact and a low runner are spaced apart in case there is a protruding contact.

The "arc-guided path (A.P)" means a direction of an electromagnetic force received by an arc generated by a magnet unit according to an embodiment of the present disclosure by a Lorentz force. The path of the arc may be guided by the electromagnetic force generated by the Lorentz force.

Figure 1:
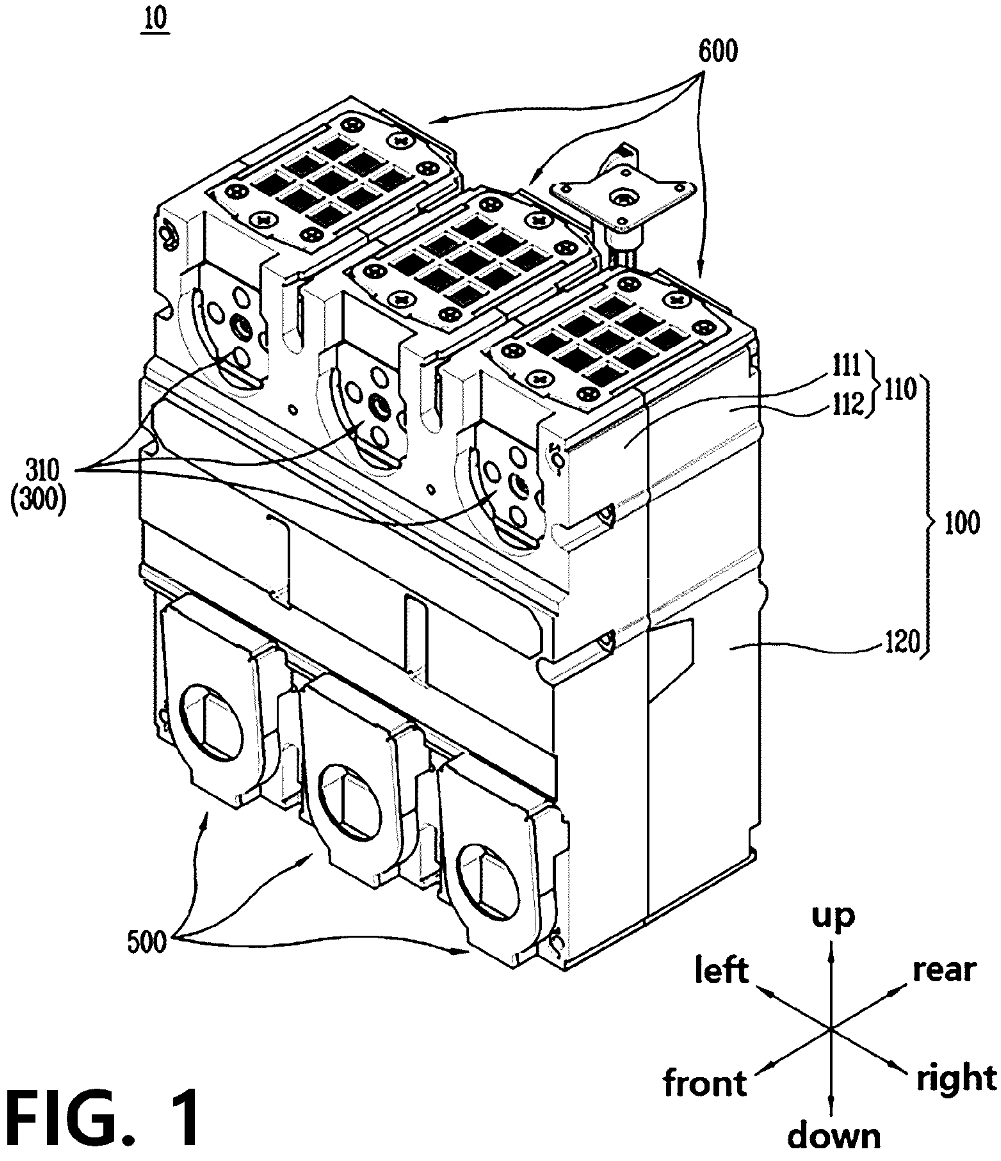
FIG. 1 is a perspective view of an air circuit breaker according to an exemplary embodiment of the present disclosure.
Figure 2:
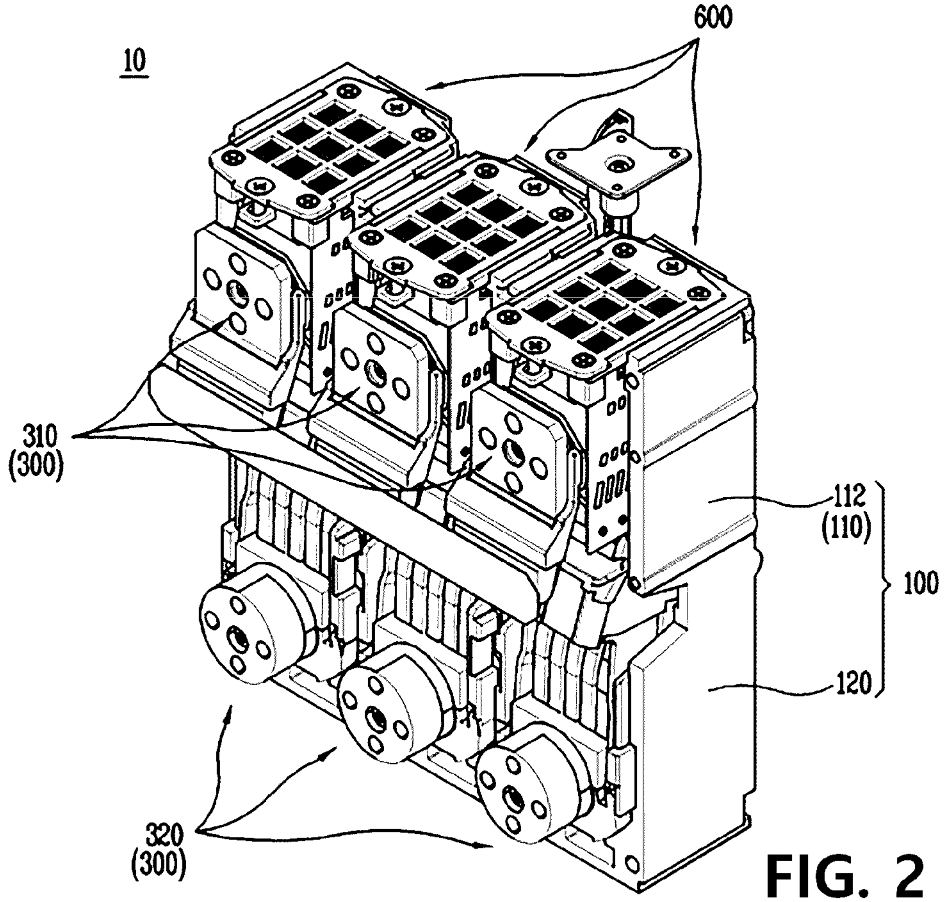
FIG. 2 is a perspective view illustrating a state in which a rear cover is removed from the air circuit breaker of FIG. 1.
Figure 3:
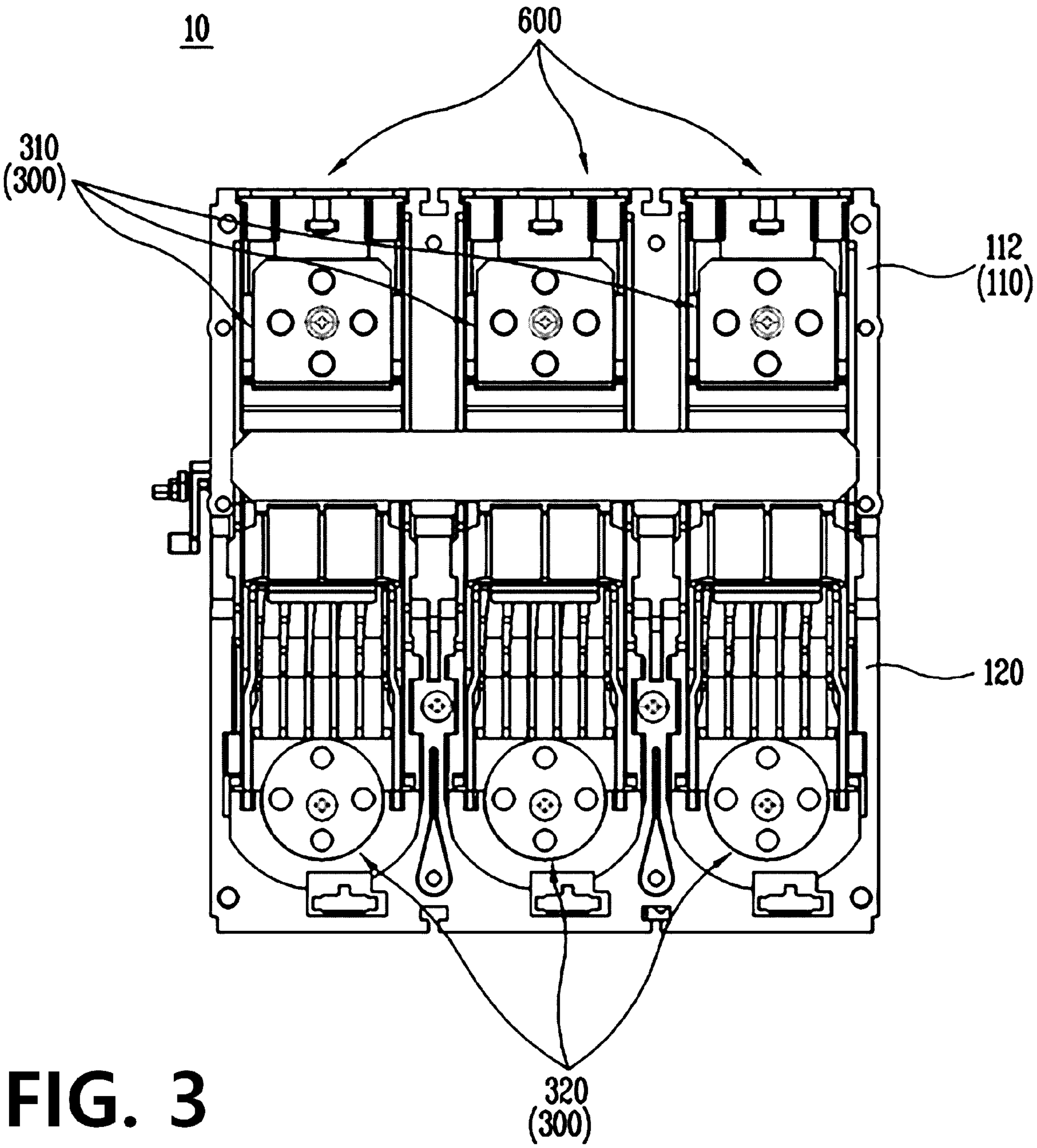
FIG. 3 is a front view illustrating a state in which a rear cover is removed from the air circuit breaker of FIG. 1.
Figure 4:
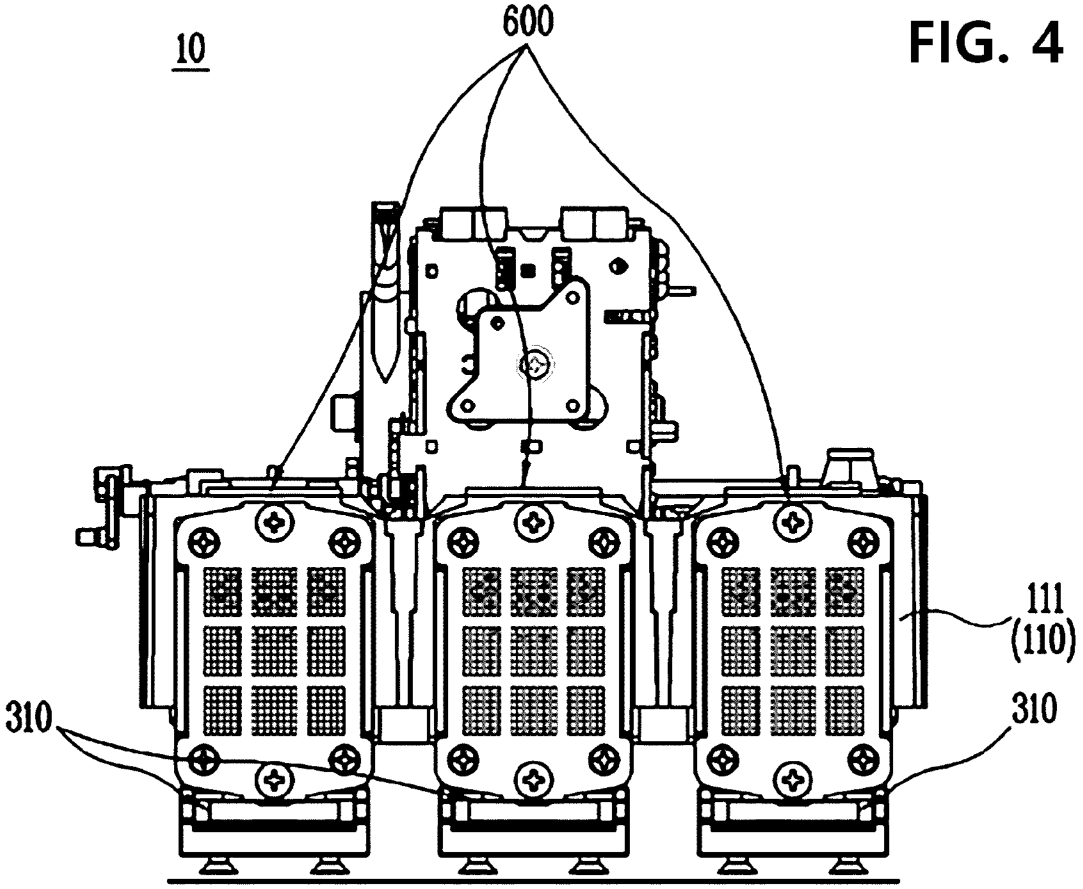
FIG. 4 is a plan view illustrating a state in which a rear cover is removed from the air circuit breaker of FIG. 1.
Figure 5:
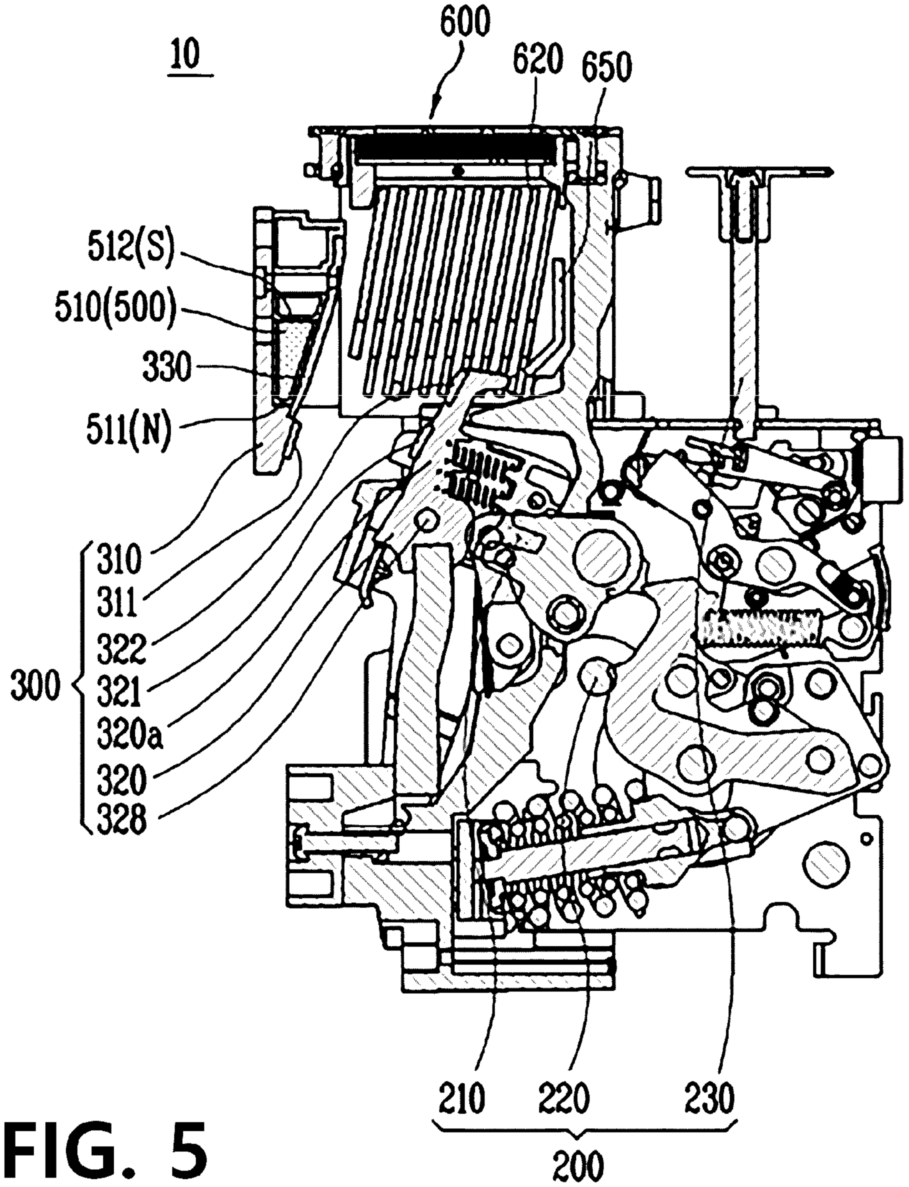
FIG. 5 is a cross-sectional view illustrating a state in which a rear cover is removed from the air circuit breaker of FIG. 1.

The terms "upper side or above", "lower side or below", "left side", "right side", "front side", and "rear side" used in the following description will be understood with reference to the coordinate system shown in FIG. 1.

2. Description of an Air Circuit Breaker 10 According to an Embodiment of the Present Disclosure Referring to FIGS. 1 to 25, the air circuit breaker 10 according to an embodiment of the present disclosure includes a cover unit 100, a driving unit 200, a circuit breaking unit 300, and an arc extinguishing unit 600.

(1) Description of the Cover Unit 100

Referring to FIGS. 1 to 5, the air circuit breaker 10 according to an embodiment of the present disclosure includes a cover unit 100.

The cover unit 100 forms the outer shape of the air circuit breaker 10. In addition, a space is formed inside the cover unit 100, and each component for operating the air circuit breaker 10 can be mounted in the space. That is, the cover unit 100 functions as a kind of housing.

The cover unit 100 may be formed of a material with high heat resistance and high rigidity. This is to prevent damage to each component mounted inside and to prevent damage caused by an arc generated inside. In an embodiment, the cover unit 100 may be formed of synthetic resin or reinforced plastic.

In the illustrated embodiment, the cover unit 100 has a quadrangular pillar shape with a height in the up and down direction. The shape of the cover unit 100 may be provided in any shape capable of mounting components for operating the air circuit breaker 10 therein.

The inner space of the cover unit 100 is energized to the outside. Each component mounted inside the cover unit 100 may be energizably connected to an external power source or load.

In the illustrated embodiment, the cover unit 100 includes an upper cover 110 and a lower cover 120.

The upper cover 110 forms the upper side of the cover unit 100. The upper cover 110 is positioned above the lower cover 120. In an embodiment, the upper cover 110 and the lower cover 120 may be integrally formed.

A space is formed inside the upper cover 110. Various components provided in the air circuit breaker 10 are mounted in the space. In an embodiment, the circuit breaking unit 300, the arc extinguishing unit 600, and the like may be mounted in the inner space of the upper cover 110.

The inner space of the upper cover 110 communicates with the inner space of the lower cover 120. Components such as the circuit breaking unit 300 may be accommodated throughout the inner space of the upper cover 110 and the inner space of the lower cover 120.

The arc extinguishing unit 600 is located on one side of the upper cover 110, i.e., on the upper surface in the illustrated embodiment. The arc extinguishing unit 600 may be partially exposed on the upper surface of the upper cover 110. The arc generated in the inner space of the upper cover 110 may pass through the arc extinguishing unit 600 and may be extinguished and discharged to the outside of the air circuit breaker 10.

On the other side of the upper cover 110, i.e., the front side in the illustrated embodiment, a fixed contact terminal 310 of the circuit breaking unit 300 is exposed. The fixed contact terminal 310 may be energizably connected to an external power source or load through the exposed portion.

In the illustrated embodiment, the upper cover 110 includes a first upper cover 111 and a second upper cover 112.

The first upper cover 111 is configured to cover one side of the upper side of the air circuit breaker 10, i.e., the front side in the illustrated embodiment. The first upper cover 111 is coupled to the second upper cover 112 by any fastening means.

An opening is formed in the first upper cover 111. The fixed contact terminal 310 may be exposed to the outside through the opening. In the illustrated embodiment, three of said openings are formed in the left-right direction.

The second upper cover 112 is configured to cover the other side of the upper side of the air circuit breaker 10, i.e., the rear side in the illustrated embodiment. The second upper cover 112 is coupled to the first upper cover 111 by any fastening means.

The lower cover 120 forms the lower side of the cover unit 100. The lower cover 120 is positioned below the upper cover 110.

A space is formed inside the lower cover 120. Various components provided in the air circuit breaker 10 are mounted in the space. In an embodiment, the driving unit 200, the circuit breaking unit 300, and the like may be mounted in the inner space of the lower cover 120.

The inner space of the lower cover 120 communicates with the inner space of the upper cover 110. Components such as the circuit breaking unit 300 may be accommodated throughout the inner space of the lower cover 120 and the inner space of the upper cover 110.

On one side of the lower cover 120, i.e., the front side in the illustrated embodiment, a movable contact terminal 320 of the circuit breaking unit 300 is located. The movable contact terminal 320 may be exposed to the outside through an opening formed in the lower cover 120. The movable contact terminal 320 may be energizably connected to an external power source or load through the exposed portion.

(2) Description of the Driving Unit 200

Referring to FIGS. 1 to 5, the air circuit breaker 10 according to an embodiment of the present disclosure includes a driving unit 200.

The driving unit 200 is rotated as the fixed contact 311 and the movable contact 321 of the circuit breaking unit 300 are spaced apart, thereby performing a trip mechanism. Accordingly, the air circuit breaker 10 may break energization with the outside, and the user can recognize that an operation to break energization has been performed.

The driving unit 200 is accommodated inside the air circuit breaker 10. Specifically, the driving unit 200 is partially accommodated in a space inside the cover unit 100. In addition, the remaining portion of the driving unit 200 is accommodated inside a case provided on one side (the rear side in the illustrated embodiment) of the cover unit 100, which is not given with reference numerals.

The driving unit 200 is connected to the circuit breaking unit 300. Specifically, a crossbar 220 of the driving unit 200 is configured to rotate together with the rotation of the movable contact terminal 320 of the circuit breaking unit 300.

Therefore, when the movable contact terminal 320 of the circuit breaking unit 300 is rotated and moved, the driving unit 200 may be rotated together. The driving unit 200 is rotatably accommodated inside the air circuit breaker 10.

In the illustrated embodiment, the driving unit 200 includes a shooter 210, a crossbar 220 and a lever 230.

The shooter 210 is rotated together as the movable contact terminal 320 of the circuit breaking unit 300 is rotated away from the fixed contact terminal 310. The shooter 210 is connected to the crossbar 220 and the lever 230.

Specifically, one end of the shooter 210 is restrained by the crossbar 220. An elastic member is provided at the other end of the shooter 210. Accordingly, in a state in which the fixed contact 311 and the movable contact 321 are in contact, the shooter 210 presses the elastic member and stores restoring force. The external force for the pressing may be provided by a state in which the crossbar 220 is rotated toward the fixed contact terminal 310.

When the movable contact 321 is spaced apart from the fixed contact 311, the movable contact terminal 320 is rotated in a direction away from the fixed contact terminal 310. Accordingly, the crossbar 220 is also rotated, and one end of the shooter 210 is released and rotated by the restoring force provided by the elastic member.

The shooter 210 is connected to the lever 230. As the shooter 210 is rotated and strikes the lever 230, the lever 230 may also be rotated, and a trip mechanism may be performed.

The crossbar 220 is connected to the movable contact terminal 320 and is rotated together as the movable contact terminal 320 is rotated. Accordingly, the shooter 210 restrained by the crossbar 220 may be released, and a trip mechanism may be performed.

The crossbar 220 may extend between the plurality of circuit breaking units 300. In the illustrated embodiment, a total of three movable contact terminals 320 of the circuit breaking unit 300 are provided and disposed in the left-right direction. The crossbar 220 may be connected through the plurality of movable contact terminals 320 disposed in the left-right direction.

The crossbar 220 contacts the one end of the shooter 210 to restrain the shooter 210. When the crossbar 220 is rotated together with the movable contact terminal 320, the crossbar 220 releases the one end of the shooter 210.

The lever 230 may be hit and rotated by the rotating shooter 210. The lever 230 may be partially exposed to the outside of the air circuit breaker 10. When the trip mechanism is performed by the circuit breaking unit 300, the lever 230 is rotated in a preset direction.

Accordingly, the user can easily recognize that the trip mechanism has been performed. In addition, the user can rotate the lever 230 to adjust the air circuit breaker to a state in which it can be energized again.

The process of performing the trip mechanism by the driving unit 200 is a well-known technique, and thus a detailed description thereof will be omitted.

(3) Description of the Circuit Breaking Unit 300

Referring to FIGS. 1 to 5, the air circuit breaker 10 according to an embodiment of the present disclosure includes a circuit breaking unit 300.

The circuit breaking unit 300 includes a fixed contact terminal 310 and a movable contact terminal 320 spaced apart from each other or in contact with each other.

When the fixed contact terminal 310 and the movable contact terminal 320 are in contact with each other, the air circuit breaker 10 may be energized with an external power source or load. When the fixed contact terminal 310 and the movable contact terminal 320 are spaced apart from each other, the air circuit breaker 10 is de-energized from an external power source or load. In this case, the external power applied to the air circuit breaker 10 may be DC power. In addition, the external power applied to the air circuit breaker 10 may be a small current.

The circuit breaking unit 300 is accommodated inside the air circuit breaker 10. Specifically, the circuit breaking unit 300 is rotatably accommodated in the inner space of the cover unit 100.

The circuit breaking unit 300 may be energized with the outside. In an embodiment, current from an external power source or load may flow into any one of the fixed contact terminal 310 and the movable contact terminal 320. In addition, current may flow from the other one of the fixed contact terminal 310 and the movable contact terminal 320 to an external power source or load.

The circuit breaking unit 300 may be partially exposed to the outside of the air circuit breaker 10. Accordingly, the circuit breaking unit 300 may be energizably connected to an external power source or load through a member such as a conducting wire (not shown).

A plurality of circuit breaking units 300 may be provided. The plurality of circuit breaking units 300 may be disposed to be spaced apart from each other in one direction. A partition wall may be provided between each of the circuit breaking units 300 to prevent interference between currents energized to each of the circuit breaking units 300.

In the illustrated embodiment, three circuit breaking units 300 are provided. In addition, the three circuit breaking units 300 are disposed to be spaced apart from each other in the left-right direction of the air circuit breaker 10. The number of circuit breaking units 300 may be changed according to the amount of current flowing through the air circuit breaker 10.

In the illustrated embodiment, the circuit breaking unit 300 includes a fixed contact terminal 310 and a movable contact terminal 320.

The fixed contact terminal 310 may be in contact with or spaced apart from the movable contact terminal 320. When the movable contact terminal 310 contacts the fixed contact terminal 320, the air circuit breaker 10 may be energized with an external power source or load. When the fixed contact terminal 310 and the movable contact terminal 320 are spaced apart from each other, the air circuit breaker 10 is de-energized from an external power source or load.

The fixed contact terminal 310 extends upward and may extend toward the low runner 330 at a predetermined angle.

As can be seen from the name, the fixed contact terminal 310 is fixedly installed in the cover unit 100. Thus, the contact and separation of the fixed contact terminal 310 and the movable contact terminal 320 are achieved by the rotation of the movable contact terminal 320.

In the illustrated embodiment, the fixed contact terminal 310 is accommodated in the inner space of the upper cover 110.

The fixed contact terminal 310 may be partially exposed to the outside of the air circuit breaker 10. Through the exposed portion, the fixed contact terminal 310 may be energizably connected to an external power source or load.

In the illustrated embodiment, the fixed contact terminal 310 is exposed to the outside through an opening formed on the front side of the upper cover 110.

The fixed contact terminal 310 may be formed of a material having electrical conductivity. In an embodiment, the fixed contact terminal 310 may be formed of copper (Cu) or iron (Fe) and an alloy material including the same.

The fixed contact terminal 310 includes a fixed contact 311. In the illustrated embodiment, the fixed contact 311 is disposed at the lower end of the fixed contact terminal 310. In addition, the fixed contact terminal 310 extends upward.

The fixed contact 311 may be in contact with or spaced apart from the movable contact 321. The fixed contact 311 is located on one side of the fixed contact terminal 310 towards the movable contact terminal 320, i.e., on the rear side in the illustrated embodiment.

The fixed contact 311 is energized with the fixed contact terminal 310. In the illustrated embodiment, the fixed contact 311 is located on the rear side of the fixed contact terminal 310. In an embodiment, the fixed contact 311 may be integrally formed with the fixed contact terminal 310.

When the fixed contact 311 and the movable contact 321 are in contact with each other, the air circuit breaker 10 is energizably connected to an external power source or load. In addition, when the fixed contact 311 is spaced apart from the movable contact 321, the air circuit breaker 10 is de-energized from an external power source or load.

A low runner 330 may extend and protrude above the fixed contact 310. The low runner 330 may extend upward toward the arc extinguishing unit 600. One end of the low runner 330 is coupled to the fixed contact terminal 310 and the other end is formed to be spaced apart from the fixed contact terminal 310. That is, the low runner 330 may be formed such that the distance it is separated from the fixed contact terminal 310 increases as it goes upward.

Figure 11:
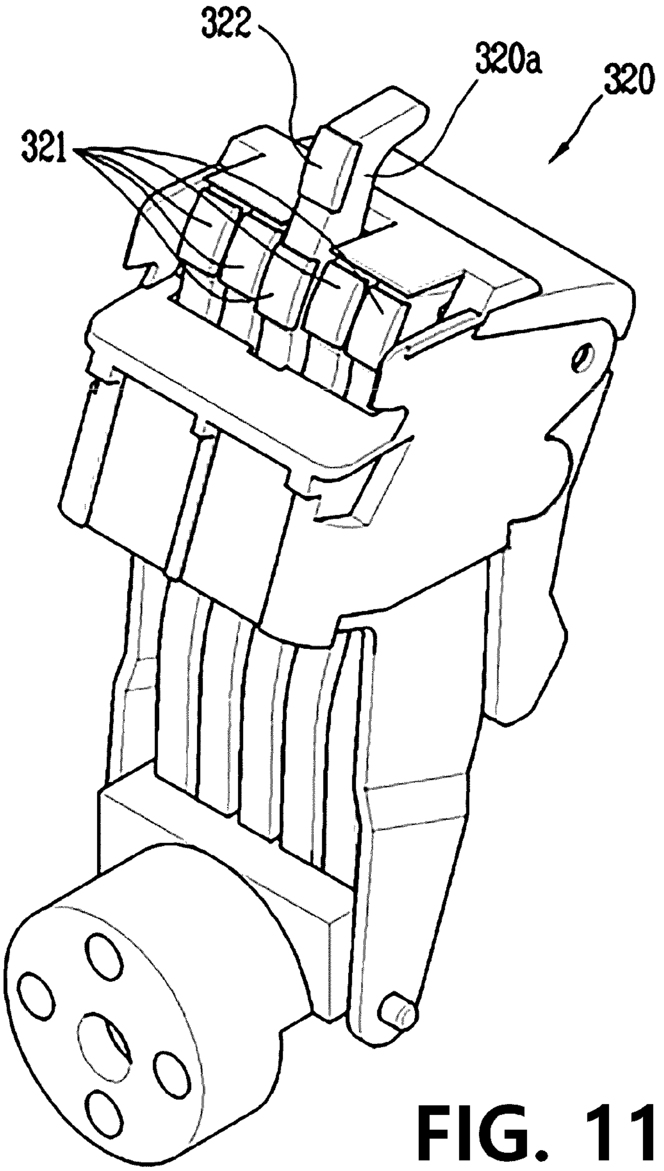
FIG. 11 is a perspective view illustrating a movable contact terminal shown in FIG. 6.

Specifically, as shown in FIG. 11, the low runner 330 extends at a predetermined angle in a direction toward the arc extinguishing unit 600, so that the separation distance between the low runner 330 and the fixed contact terminal 310 may increase toward the upper side of the low runner 330.

The low runner 330 is energized with the fixed contact terminal 310. In the illustrated embodiment, the low runner 330 is located on the rear side of the fixed contact terminal 310. In an embodiment, the low runner 330 may be integrally formed with the fixed contact terminal 310.

When the fixed contact 310 and the movable contact 320 are in contact with each other, the low runner 330 may be energized by contact with a protruding contact 322 to be described later.

The low runner 330 may serve to guide an arc generated when the fixed contact 310 and the movable contact 320 are separated from each other and transfer it to a grid 620. To this end, the low runner 330 may be formed of a magnetic material having magnetism. This is to apply an attractive force to the arc, which is a flow of electrons.

In addition, as the low runner 330 and the protruding contact 322 are spaced apart from a state in which they are in contact with each other, an arc may occur between the low runner 330 and the protruding contact 322. This will be described in detail later.

The movable contact terminal 320 may be in contact with or spaced apart from the fixed contact terminal 310. It is as described above that the air circuit breaker 10 can be energized or de-energized from an external power source or load by contact and separation between the movable contact terminal 320 and the fixed contact terminal 310.

The movable contact terminal 320 may include a movable contact terminal extension portion **320*a* in which the movable contact 321 is disposed and at least a portion thereof extends upward. Specifically, referring to the drawings, at least a portion of the movable contact terminal 320 may extend upward. The protruding contact 322 may be disposed on the movable contact terminal extension portion 320*a***.

The movable contact terminal 320 is rotatably installed in the inner space of the cover unit 100. The movable contact terminal 320 may be rotated in a direction toward the fixed contact terminal 310 and in a direction away from the fixed contact terminal 310.

In the illustrated embodiment, the movable contact terminal 320 is accommodated in the inner spaces of the upper cover 110 and the lower cover 120. It is as described above that the inner spaces of the upper cover 110 and the lower cover 120 may communicate with each other.

The movable contact terminal 320 may be partially exposed to the outside of the air circuit breaker 10. Through the exposed portion, the movable contact terminal 320 may be energizably connected to an external power source or load.

In the illustrated embodiment, the movable contact terminal 320 is exposed to the outside through an opening formed on the front side of the lower cover 120.

The movable contact terminal 320 may be formed of a material having electrical conductivity. In an embodiment, the movable contact terminal 320 may be formed of copper or iron and an alloy material including the same.

The movable contact terminal 320 is connected to the driving unit 200. Specifically, the movable contact terminal 320 is connected to the crossbar 220 of the driving unit 200. In an embodiment, the crossbar 220 may be coupled through the movable contact terminal 320.

When the movable contact terminal 320 is rotated, the crossbar 220 may also be rotated. Accordingly, it is as described above that the driving unit 200 is operated, and the trip mechanism can be performed.

In the illustrated embodiment, the movable contact terminal 320 includes a movable contact 321 and a rotation shaft 328.

The movable contact 321 may be in contact with or spaced apart from the fixed contact 311. The movable contact 321 is located on one side of the movable contact terminal 320 towards the fixed contact terminal 310, i.e., on the front side in the illustrated embodiment.

The movable contact 321 may be rotated together with the movable contact terminal 320. When the movable contact terminal 320 is rotated toward the fixed contact terminal 310, the movable contact 321 may also be rotated toward the fixed contact 311 to contact the fixed contact 311.

In addition, when the movable contact terminal 320 is rotated in a direction away from the fixed contact terminal 310, the movable contact 321 may also be spaced apart from the fixed contact 311.

The movable contact 321 is energized with the movable contact terminal 320. In the illustrated embodiment, the movable contact 321 is located on the front side of the movable contact terminal 320. In an embodiment, the movable contact 321 may be integrally formed with the movable contact terminal 320.

It is as described above that the air circuit breaker 10 is energized with or de-energized from an external power source or load by contact and separation between the movable contact 321 and the fixed contact 311.

When the fixed contact 311 and the movable contact 321 are spaced apart from each other in a state in which the fixed contact 311 and the movable contact 321 are brought into contact with each other and are energized, an arc is generated. The air circuit breaker 10 according to an embodiment of the present disclosure includes various components for effectively forming a path of an arc generated. This will be described later in detail.

The rotation shaft 328 is a portion where the movable contact terminal 320 is rotatably coupled to the cover unit 100. The movable contact terminal 320 may be rotated in a direction toward the fixed contact terminal 310 or in a direction away from the fixed contact terminal 310 about the rotation shaft 328.

The rotation shaft 328 is located on the other side of the movable contact terminal 320 opposite to the fixed contact terminal 310, i.e., on the rear side in the illustrated embodiment.

(4) Description of the Arc Extinguishing Unit 600

Referring to FIGS. 6 to 10, the air circuit breaker 10 according to an embodiment of the present disclosure includes an arc extinguishing unit 600.

The arc extinguishing unit 600 is configured to extinguish an arc generated when the fixed contact 311 and the movable contact 321 are spaced apart. The generated arc may pass through the arc extinguishing unit 600 and be discharged to the outside of the air circuit breaker 10 after being extinguished and cooled.

The arc extinguishing unit 600 is coupled to the cover unit 100. One side of the arc extinguishing unit 600 for arc discharge may be exposed to the outside of the cover unit 100. In the illustrated embodiment, the upper side of the arc extinguishing unit 600 is exposed to the outside of the cover unit 100.

The arc extinguishing unit 600 is partially accommodated in the cover unit 100. The remaining portion of the arc extinguishing unit 600 except for the portion exposed to the outside may be accommodated in the inner space of the cover unit 100. In the illustrated embodiment, the arc extinguishing unit 600 is partially accommodated on the upper side of the upper cover 110.

The arrangement may be changed according to the position of the fixed contact 311 and the movable contact 312. That is, the arc extinguishing unit 600 may be positioned adjacent to the fixed contact 311 and the movable contact 312. Accordingly, an arc extending along the movable contact 312 rotated away from the fixed contact 311 may easily enter the arc extinguishing unit 600.

A plurality of arc extinguishing units 600 may be provided. The plurality of arc extinguishing units 600 may be disposed to be physically and electrically spaced apart from each other. In the illustrated embodiment, three arc extinguishing units 600 are provided. However, the arc extinguishing unit 600 is not limited thereto, and there may be provided with one or more or a plurality of arc extinguishing units 600.

That is, each arc extinguishing unit 600 is positioned adjacent to each fixed contact 311 and movable contact 321. In the illustrated embodiment, each arc extinguishing unit 600 is positioned adjacent to the upper side of each fixed contact 311 and movable contact 321.

It will be understood that each arc extinguishing unit 600 is configured to extinguish an arc generated when the current of each phase energized to each circuit breaking unit 300 is broken.

The arc extinguishing units 600 may be disposed adjacent to each other. In the illustrated embodiment, the three arc extinguishing units 600 are disposed side by side in the left-right direction of the air circuit breaker 10.

In the illustrated embodiment, the arc extinguishing unit 600 includes a side plate 610, a grid 620, a grid cover 630, and an arc runner 650.

Side plates 610 form both sides of arc extinguishing unit 600, i.e., the right side and the left side in the illustrated embodiment. The side plate 610 is coupled to each component of the arc extinguishing unit 600 and supports the components.

Specifically, the side plate 610 is coupled to the grid 620, the grid cover 630, and the arc runner 650.

A plurality of side plates 610 are provided. The plurality of side plates 610 may be spaced apart from each other and disposed to face each other. In the illustrated embodiment, two side plates 610 are provided, forming the right and left sides of the arc extinguishing unit 600, respectively.

The side plate 610 may be formed of an insulating material. This is to prevent the generated arc from flowing toward the side plate 610.

The side plate 610 may be formed of a heat-resistant material. This is to prevent damage or shape deformation by the generated arc.

A plurality of through holes are formed in the side plate 610. The grid 620 and the arc runner 650 may be inserted and coupled to some of the through holes. In addition, fastening members for fastening the grid cover 630 to the side plate 610 may be coupled through some of the other through holes.

In the illustrated embodiment, the side plate 610 is provided in a plate shape having a plurality of edges formed at vertices. The side plate 610 may be provided in any shape capable of forming both sides of the arc extinguishing unit 600 and supporting each component of the arc extinguishing unit 600.

The side plate 610 is coupled to the grid 620. Specifically, insertion protrusions provided at opposite sides of the grid 620, i.e., the right end and the left end in the illustrated embodiment, are inserted into and coupled to some of the through holes of the side plate 610.

The side plate 610 is coupled to the grid cover 630. Specifically, the grid cover 630 is coupled to the upper side of the side plate 610. The above coupling may be achieved by a fitting coupling between the side plate 610 and the grid cover 630 or by a separate fastening member.

The side plate 610 is coupled to the arc runner 650. Specifically, the arc runner 650 is coupled to the rear side of the side plate 610, that is, to one side opposite to the fixed contact 311. The above coupling may be achieved by a separate fastening member.

The grid 620 guides an arc generated when the fixed contact 311 and the movable contact 321 are spaced apart to the arc extinguishing unit 600.

The grid 620 may be formed of a material having magnetism. This is to apply an attractive force to the arc, which is a flow of electrons.

A plurality of grids 620 may be provided. The plurality of grids 620 may be spaced apart from each other and stacked. In the illustrated embodiment, a plurality of grids 620 are provided and stacked in the front-rear direction.

The number of grids 620 may be changed. Specifically, the number of grids 620 may be changed according to the size and performance of the arc extinguishing unit 600, or the rated capacity of the air circuit breaker 10 in which the arc extinguishing unit 600 is provided, or the like.

An introduced arc may be subdivided and flowed through a space formed by the plurality of grids 620 being spaced apart from each other. Accordingly, the pressure of the arc may be increased, and the moving speed and the extinguishing speed of the arc may be increased.

The arc runner 650 is positioned adjacent to the grid 620 furthest from the fixed contact 311 among the plurality of grids 620, i.e., the grid 620 on the rear side in the illustrated embodiment.

An end of the grid 620 in the width direction, i.e., left-right direction in the illustrated embodiment, may be formed to protrude toward the fixed contact 311, that is, toward the lower side. That is, the grid 620 is formed in a peak shape with left and right ends pointing downward.

Accordingly, the generated arc may effectively proceed toward the end of the grid 620 in the left-right direction, and may easily flow to the arc extinguishing unit 600.

The grid 620 is coupled to the side plate 610. Specifically, a plurality of coupling protrusions are formed at the edges of the grid 620 in the width direction, i.e., the left-right direction in the illustrated embodiment, in the extension direction, i.e., the up and down direction in the illustrated embodiment. The coupling protrusions of the grid 620 are inserted into and coupled to the through holes formed in the side plate 610.

One side of the grid 620 facing the grid cover 630, i.e., the upper end in the illustrated embodiment, may be positioned adjacent to the grid cover 630. The arc flowing along the grid 620 may pass through the grid cover 630 and be discharged to the outside.

The grid cover 630 forms the upper side of the arc extinguishing unit 600. The grid cover 630 is configured to cover the upper end of the grid 620. The arc passing through the space formed by the plurality of grids 620 spaced apart from each other may be discharged to the outside of the air circuit breaker 10 through the grid cover 630.

The grid cover 630 is coupled to the side plate 610. A protrusion inserted into the through hole of the side plate 610 may be formed at an edge of the grid cover 630 in the width direction, i.e., the left-right direction in the illustrated embodiment. In addition, the grid cover 630 and the side plate 610 may be coupled by a separate fastening member.

The grid cover 630 is formed to extend in one direction, i.e., in the front-rear direction in the illustrated embodiment. It will be understood that the above direction is the same as the direction in which the plurality of grids 620 are stacked.

The length of the grid cover 630 in the other direction, i.e., the width direction in the illustrated embodiment, may be determined according to the length of the plurality of grids 620 in the width direction.

In the illustrated embodiment, the grid cover 630 includes a cover body 631, an upper frame 632, a mesh part 633, and a circuit breaking plate (not shown).

The cover body 631 forms the outer shape of the grid cover 630. The cover body 631 is coupled to the side plate 610. In addition, the upper frame 632 is coupled to the cover body 631.

A predetermined space is formed inside the cover body 631. The space may be covered by the upper frame 632. The mesh part 633 and the circuit breaking plate are accommodated in the space. Accordingly, the space may be referred to as an "accommodation space".

The accommodation space communicates with a space formed by spacing the grids 620 apart. As a result, the accommodation space communicates with the inner space of the cover unit 100. Accordingly, the generated arc can flow into the accommodation space of the cover body 631 by passing through the space formed by the separation of the grids 620.

An upper end of the grid 620 may be in contact with one side of the cover body 631 facing the grid 620, i.e., the lower side in the illustrated embodiment. In an embodiment, the cover body 631 may support the upper end of the grid 620.

The cover body 631 may be formed of an insulating material. This is to prevent distortion of the magnetic field for forming an arc-guided path A.P.

The cover body 631 may be formed of a heat-resistant material. This is to prevent damage or shape deformation by the generated arc.

In the illustrated embodiment, the length of the cover body 631 in the front-rear direction is longer than the length in the left-right direction. The shape of the cover body 631 may be changed according to the shape of the side plate 610 and the shape and number of the grids 620.

The upper frame 632 is coupled to one side of the cover body 631 opposite to the grid 620, i.e., the upper side in the illustrated embodiment.

The upper frame 632 is coupled to the upper side of the cover body 631. The upper frame 632 is configured to cover the accommodation space formed in the cover body 631, the mesh part 633 accommodated in the accommodation space, and the circuit breaking plate.

In the illustrated embodiment, the length of the upper frame 632 in the front-rear direction is longer than the length in the left-right direction. The upper frame 632 may be provided in an arbitrary shape capable of stably being coupled to the upper side of the cover body 631 and covering the accommodation space and components accommodated in the accommodation space.

A plurality of through holes are formed in the upper frame 632. Through the through hole, an arc passing between the grids 620 and extinguished may be discharged. In the illustrated embodiment, three through-holes are provided in three rows in the front-rear direction, three in the left-right direction, and a total of nine through holes are formed. The number of through holes may be changed.

The through holes are located to be spaced apart from each other. A kind of rib is formed between the through holes. The rib may press the mesh part 633 accommodated in the space of the cover body 631, and the circuit breaking plate from the upper side.

Accordingly, even though an arc is generated, the mesh part 633 and the circuit breaking plate do not arbitrarily move away from the accommodation space of the cover body 631.

The upper frame 632 may be fixedly coupled to an upper side of the cover body 631. In the illustrated embodiment, the upper frame 632 is fixedly coupled to the upper side of the cover body 631 by a fastening member.

The mesh part 633 and the circuit breaking plate are positioned in the accommodation space of the cover body 631 between the upper frame 632 and the cover body 631, that is, in the lower side of the upper frame 632. In other words, the mesh part 633 and the circuit breaking plate are stacked from an upper side to a lower side in the accommodation space of the cover body 631.

The mesh part 633 passes through a space formed between the grids 620 and serves to filter out impurities remaining in the extinguished arc. The extinguished arc may pass through the mesh part 633 and be discharged to the outside after remaining impurities are removed. That is, the mesh part 633 functions as a kind of filter.

The mesh part 633 includes a plurality of through holes. It is preferable that the size, that is, the diameter of the through hole is smaller than the diameter of the impurity particles remaining in the arc. In addition, it is preferable that the diameter of the through hole is sufficiently large so that the gas included in the arc can pass through.

A plurality of mesh parts 633 may be provided. The plurality of mesh parts 633 may be stacked in the up and down direction. Accordingly, impurities remaining in the arc passing through the mesh part 633 can be effectively removed.

The mesh part 633 is accommodated in the accommodation space formed inside the cover body 631. The shape of the mesh part 633 may be determined according to the shape of the accommodation space.

The mesh part 633 is located below the upper frame 632. The plurality of through holes formed in the mesh part 633 communicate with the plurality of through holes formed in the upper frame 632. Accordingly, the arc passing through the mesh part 633 may pass through the upper frame 632 and be discharged to the outside.

The plurality of through holes formed in the mesh part 633 communicate with a space in which the grids 620 are spaced apart. As a result, the plurality of through holes formed in the mesh part 633 communicate with the inner space of the cover unit 100.

The circuit breaking plate is positioned below the mesh part 633. The circuit breaking plate provides a passage for the arc passing through the space formed between the grids 620 to flow toward the mesh part 633. The circuit breaking plate is accommodated in the accommodation space of the cover body 631. The circuit breaking plate is located at the lowermost side of the accommodation space of the cover body 631.

In the illustrated embodiment, the circuit breaking plate is formed to have a rectangular cross-section in which the length in the front-rear direction is longer than the length in the left-right direction. The shape of the circuit breaking plate may be changed according to the shape of the cross-section of the accommodation space of the cover body 631.

The grid 620 is positioned below the circuit breaking plate. In an embodiment, the upper end of the grid 620, i.e., one end of the grid 620 facing the circuit breaking plate, may be in contact with the circuit breaking plate. The circuit breaking plate includes a through hole (not shown).

The through hole is a passage through which an arc passing through a space formed by spacing the plurality of grids 620 from each other flows into the accommodation space of the cover body 631. The through hole is formed through in a direction perpendicular to the circuit breaking plate, i.e., in the up and down direction in the illustrated embodiment.

A plurality of through holes may be formed. The plurality of through holes may be disposed to be spaced apart from each other.

The arc runner 650 is located on one side of the side plate 610 facing the fixed contact 311 and the movable contact 321. In the illustrated embodiment, the arc runner 650 is located on the lower side of the side plate 610.

The arc runner 650 is located on the other side of the side plate 610 opposite to the fixed contact 311. Specifically, the arc runner 650 is located on the rear side in the lower side of the side plate 610 so as to be opposite to the fixed contact 311 located on the front side of the side plate 610.

The arc runner 650 is coupled to the side plate 610. The coupling may be formed by inserting a protrusion formed at an end of the arc runner 650 in the left-right direction into a through hole formed in the side plate 610.

The arc runner 650 may be formed of a conductive material. This is to guide the arc effectively by applying an attractive force to the flowing arc. In an embodiment, the arc runner 650 may be formed of copper, iron, or an alloy including the same.

The arc runner 650 extends toward the grid 620 by a predetermined length. In an embodiment, the arc runner 650 may be disposed to cover the grid 620 located farthest from the fixed contact 311, i.e., the grid 620 located at the rearmost side in the illustrated embodiment, from the rear side.

Accordingly, since the arc does not extend beyond the grid 620 located at the rearmost side, damage to the cover unit 100 can be prevented. Also, the generated arc can be effectively guided toward the grid 620.

(5) Description of the Protruding Contact 322

Figure 12:
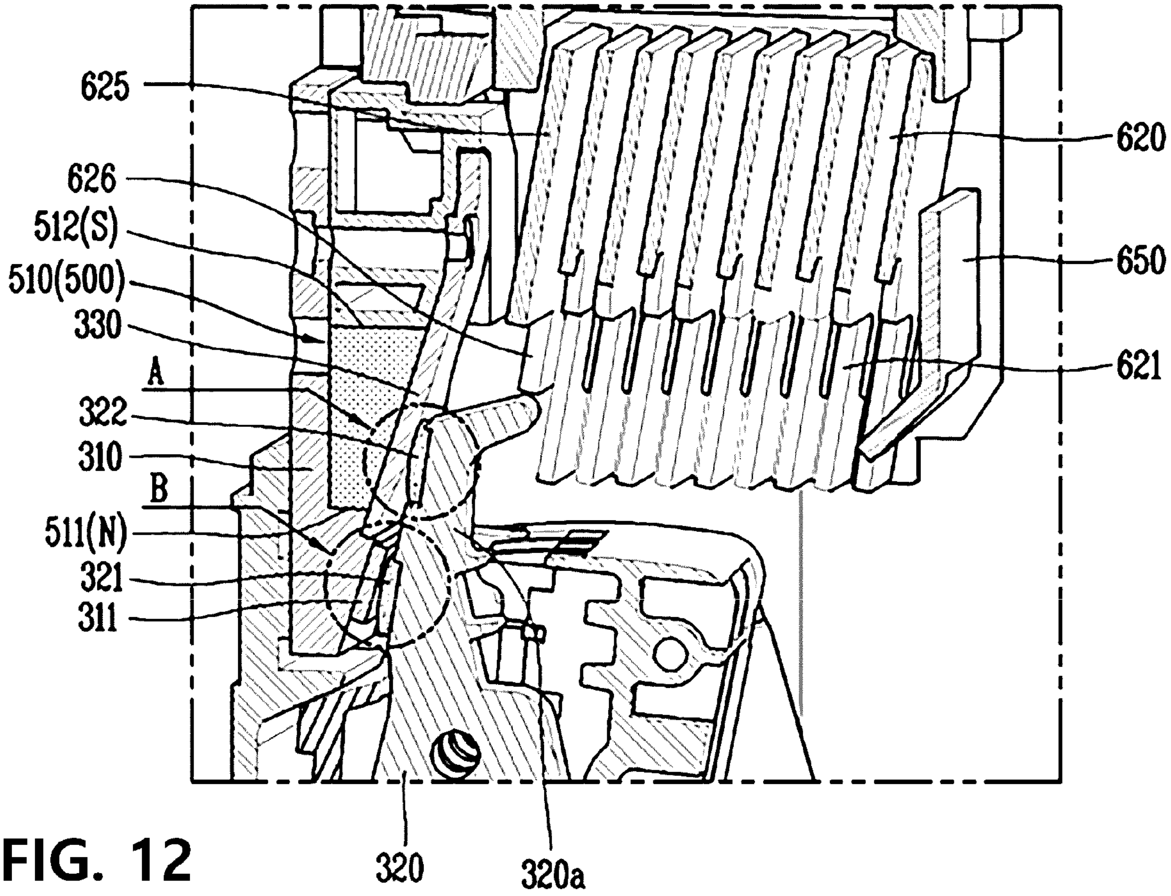
FIG. 12 is a perspective view illustrating a circuit breaking unit and an arc extinguishing unit shown in FIG. 5.
Figure 13:
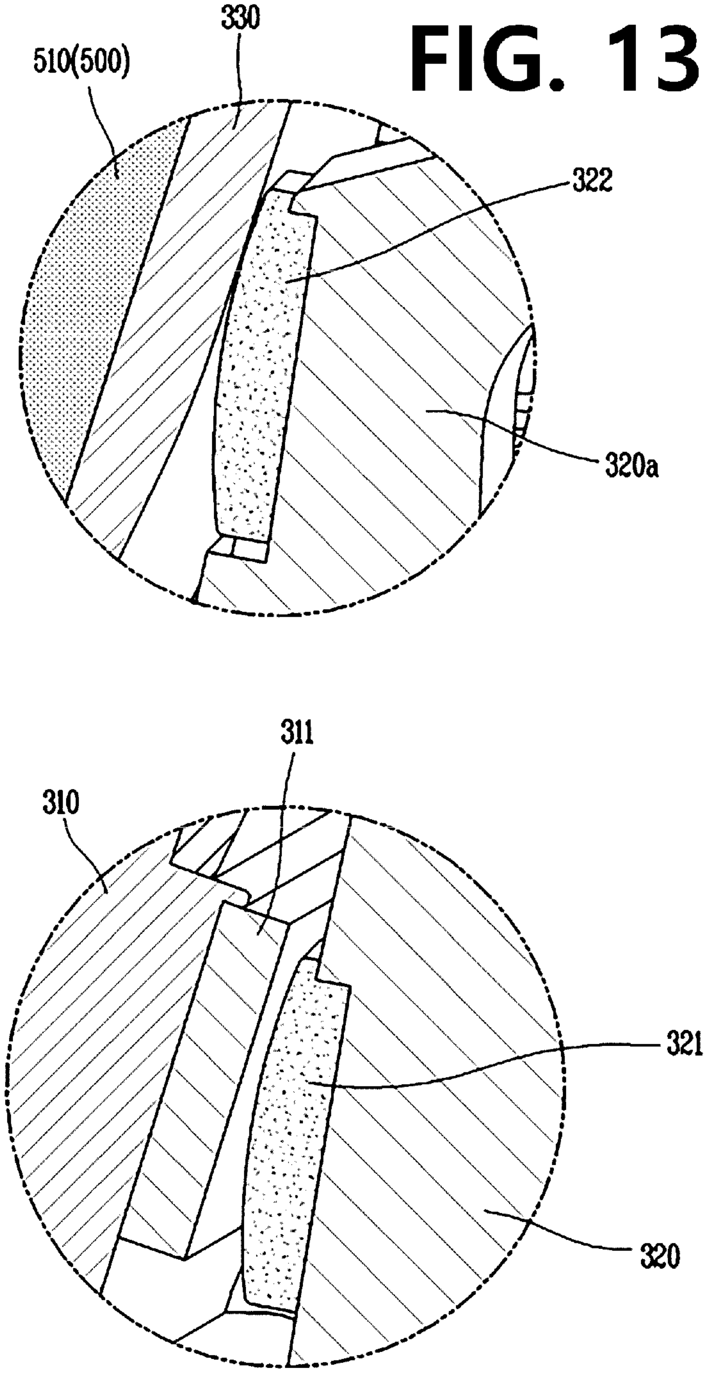
FIG. 13 is a partially enlarged view illustrating a state in which a protruding contact and a low runner, and a fixed contact and a movable contact of the circuit breaking unit and the arc extinguishing unit shown in FIG. 12 are brought into contact with each other or separated from each other in a first state of a trip state.

Referring to FIGS. 11 to 13, the circuit breaking unit 300 according to an embodiment of the present disclosure may further include a protruding contact 322.

The protruding contact 322 may be disposed on the movable contact terminal extension portion **320*a* to be spaced apart from the movable contact 321. That is, the protruding contact 322 is spaced apart from the movable contact 321 along the movable contact terminal extension portion 320*a* and disposed above the movable contact 321. In this case, the protruding contact 322 may be disposed to contact the low runner 330 while the movable contact 321 is in contact with the fixed contact 311**.

As the protruding contact 322 and the low runner 330 are in contact with each other, and thus, there may be energized between the protruding contact 322 and the low runner 330.

And, when the movable contact terminal 320 is tripped, the protruding contact 322 and the low runner 330 are also spaced apart from each other, and during this process, an arc may be generated between the protruding contact 322 and the low runner 330.

The protruding contact 322 is disposed extending from at least one of the plurality of movable contacts 321.

For example, the protruding contact 322 may be formed by protruding the middle three of the five movable contacts 321, or by protruding the first, third, and fifth movable contacts 321, or by protruding the second, fourth movable contacts 321. Alternatively, in a case different from the case described above, the protruding contact 322 may be formed extending from at least one of the movable contacts 321.

In an embodiment of the present disclosure, as shown in FIG. 13, the protruding contact 322 may protrude from an upper side of the centrally disposed movable contact 321 among the plurality of movable contacts 321.

The protruding contact 322 may extend upward so as to overlap at least a portion of the side plate 610 of the arc extinguishing unit 600 disposed above the protruding contact 322.

Specifically, as shown in FIGS. 12 and 13, the protruding contact 322 may extend so that an upper portion of the protruding contact 322 overlaps the side plate 610 of the arc extinguishing unit 600. Through this, the generated arc can be more quickly applied to the grid 620 and extinguished.

The width of the protruding contact 322 may be formed to correspond to the width of the movable contact 321 from which the protruding contact 322 extends.

Specifically, referring to FIG. 13 and the like, the width of the protruding contact 322 is formed to correspond to the width of the movable contact 321 from which the protruding contact 322 extends. In other words, the width of the protruding contact 322 may be the same as or similar to the width of the movable contact 321 from which the protruding contact 322 extends. Through this, interference with an adjacent movable contact 321 or interference between adjacent protruding contacts 322 when a plurality of protruding contacts 322 are formed can be reduced.

(6) Trip Mechanism of the Movable Contact Terminal 320 and Movement of the Arc-Generation Area A.A Referring to FIGS. 12 to 15, in the present embodiment, the arc-generation area includes a first arc-generation area A.A1 and a second arc-generation area A.A2.

The first arc-generation area A.A1 is formed between the fixed contact 311 and the movable contact 321. The second arc-generation area A.A2 is formed between the protruding contact 322 and the low runner 330.

The low runner 330 may play the same role as the fixed contact 311 in relation to the protruding contact 322. Thus, the second arc-generation area A.A2 may be formed between the protruding contact 322 and the low runner 330.

The protruding contact 322 is disposed above the movable contact 321 on the movable contact terminal 320. In this case, the protruding contact 322 and the low runner 330 are separated from each other a very short moment later than when the movable contact 321 and the fixed contact 311 are separated.

Specifically, when the trip mechanism of the movable contact terminal 320 occurs to separate the movable contact 321 from the fixed contact 311, the movable contact 321 and the fixed contact 311 may be first separated with a very short time difference, and then the protruding contact 322 and the low runner 330 may be separated.

That is, when the circuit breaking unit 300 performs the trip mechanism, the protruding contact 322 and the lower runner 330 are separated later in time than the movable contact 321 and the fixed contact 311, and thus even after energization is cut off between the movable contact 321 and the fixed contact 311, energization occurs between the protruding contact 322 and the low runner 330 for a short time.

In relation to this, the trip state will be described as follows.

The movable contact terminal 320 is made movable between an energized state in which the movable contact 321 and the fixed contact 311 are in contact with each other and the low runner 330 and the protruding contact 322 are in contact with each other, and a trip state in which the movable contact 321 and the fixed contact 311 are spaced apart from each other and the low runner 330 and the protruding contact 322 are spaced apart from each other.

Specifically, FIG. 12 is a diagram showing an energized state. The movable contact 321 and the protruding contact 322 contact the fixed contact 311 and the low runner 330, respectively, and are energized, respectively.

In this case, since DC power is applied as described above, current may flow from the fixed contact 311 and the low runner 330 to the movable contact 321 and the protruding contact 322 or vice versa.

The trip state of the movable contact terminal 320 includes a first state in which the movable contact 321 and the fixed contact 311 are spaced apart from each other and contact of the low runner 330 and the protruding contact 322 is maintained, and a second state in which the movable contact 321 and the fixed contact 311 are spaced apart from each other and the low runner 330 and the protruding contact 322 are spaced apart from each other. And, the trip state of the movable contact terminal 320 may be sequentially changed to the first state and the second state.

Figure 14:
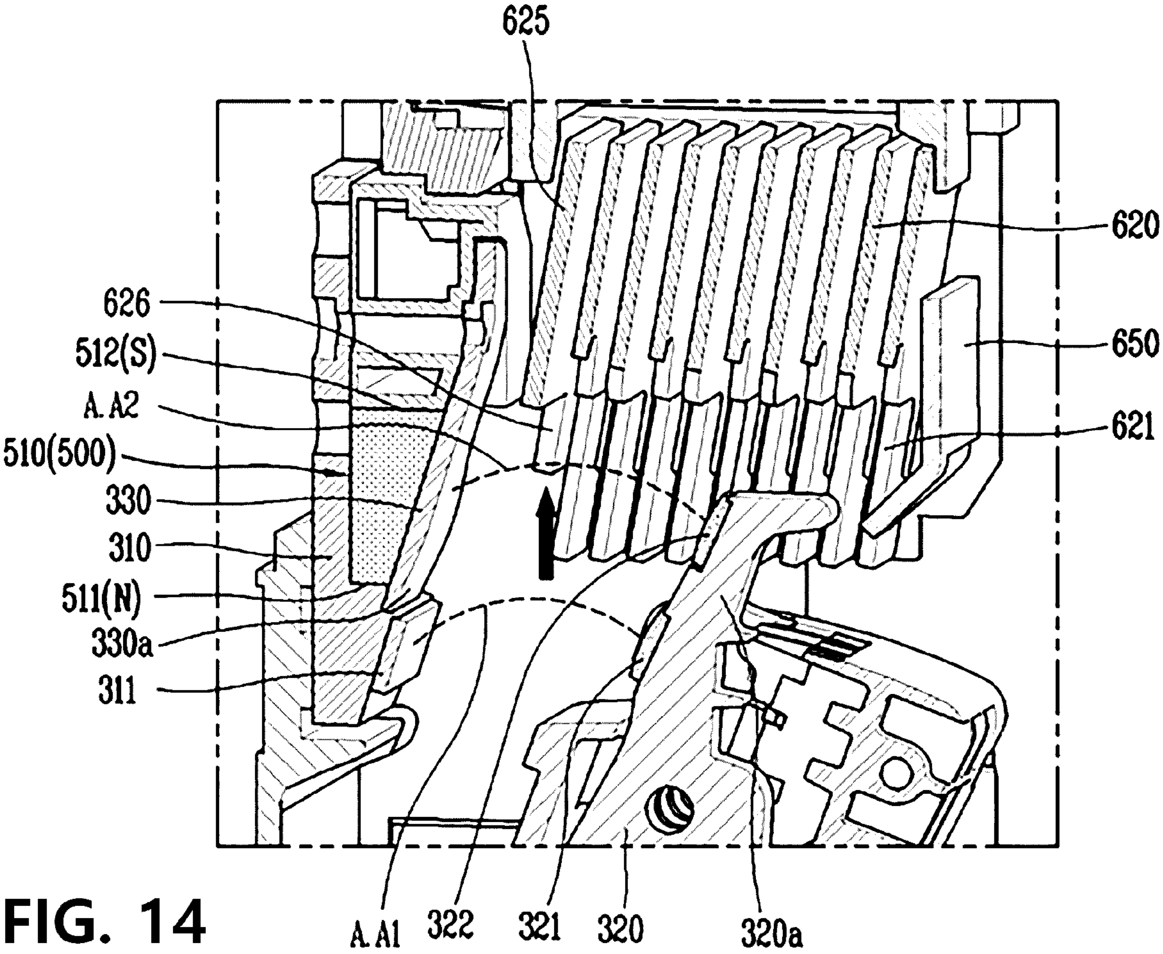
FIG. 14 is a perspective view illustrating a state in which the circuit breaking unit and the arc extinguishing unit shown in FIG. 12 are disposed in a trip state.
Figure 15:
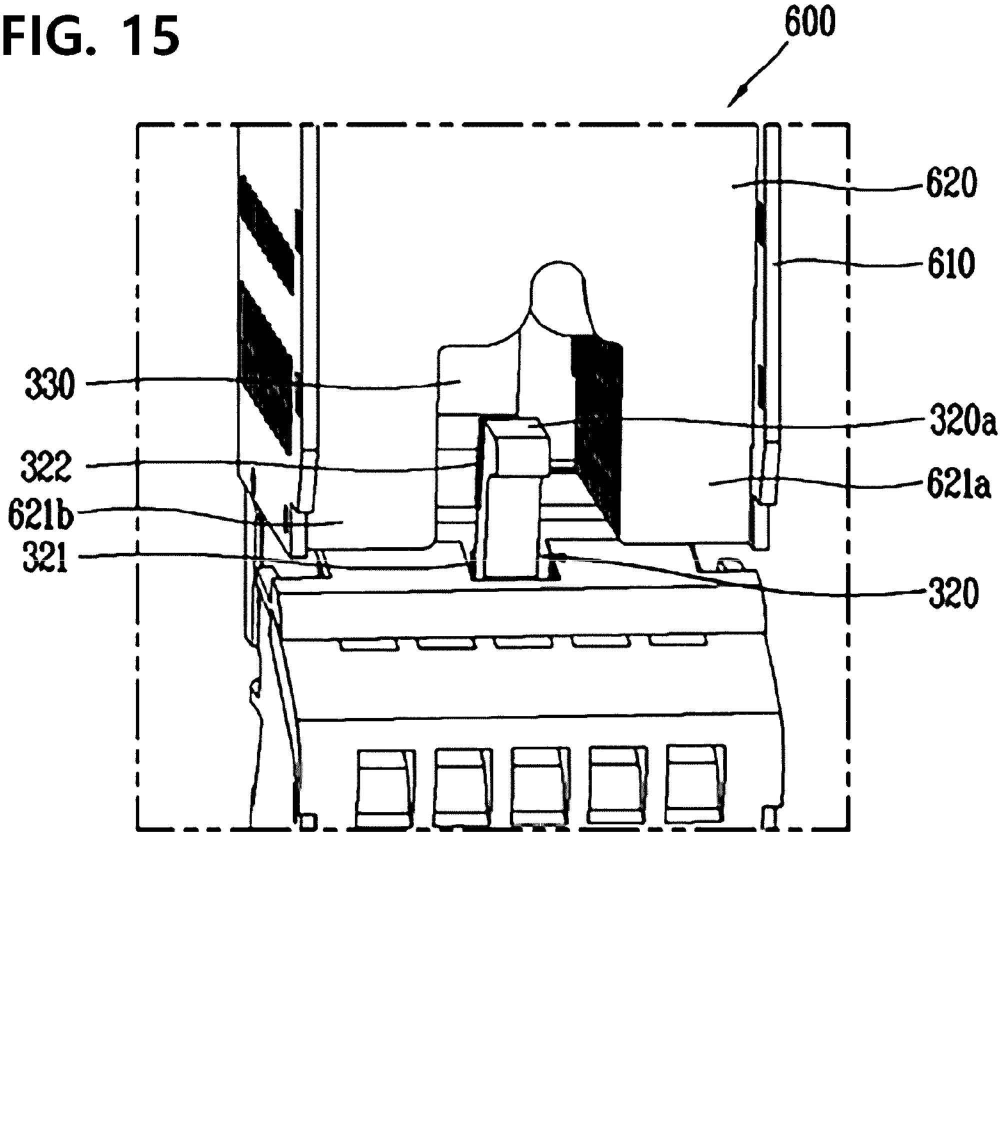
FIG. 15 is a perspective view of the circuit breaking unit and the arc extinguishing unit shown in FIG. 14 viewed from another direction.

Specifically, FIG. 12 shows an energized state, FIG. 13 shows the first state, and FIG. 14 shows the second state.

Referring to FIG. 13, in the first state, the movable contact 321 and the fixed contact 311 are spaced apart from each other. And, in the first state, contact is maintained between the low runner 330 and the protruding contact 322. Therefore, in the first state, a complete trip has not yet occurred, and energization is achieved through the low runner 330 and the protruding contact 322.

And, referring to FIG. 14, the second state is formed when the protruding contact 322 and the low runner 330 are spaced apart. An arc is generated at the final separation site.

In a state where the protruding contact 322 is not provided, an arc is generated through the first arc-generation area A.A1. However, in the first state of the trip state, since the protruding contact 322 maintains contact with the low runner 330 and the movable contact 321 and the fixed contact 311 are spaced apart from each other, when changing from the first state to the second state, the final separation site becomes the low runner 330 and the protruding contact 322.

Therefore, the arc generated in the first arc-generation area A.A1 when the protruding contact 322 is not provided is generated in the second arc-generation area A.A2 by the protruding contact 322 and the low runner 330 having the above-described features.

According to an embodiment of the present disclosure, by providing the low runner 330 and the protruding contact 322, there is an effect that the location where the arc is generated is moved upward. That is, according to an embodiment of the present disclosure, there is an effect that an area where an arc is generated is moved upward by a distance in which the protruding contact 322 protrudes upward from the movable contact 321.

In other words, in the circuit breaking unit including the protruding contact 322 and the low runner 330 according to an embodiment of the present disclosure, the arc-generation area is moved from between the movable contact 321 and the fixed contact 311 (the first arc-generation area A.A1) to between the protruding contact 322 and the low runner 330 (the second arc-generation area A.A2), and thus is moved close to the arc extinguishing unit 600, i.e., the grid 620.

The present disclosure provides a protruding contact 322 and a low runner 330 that are in contact with each other in a state in which a fixed contact 311 and a movable contact 321 are spaced apart in the first state of the trip state, and a protruding contact 322 and a low runner 330 that are spaced apart in the second state, and thus generates an arc closer to a grid 620 when a small current breaking occurs in a DC air circuit breaker. Since the distance between the generated arc and the grid 620 decreases, the time at which the arc is applied to the grid 620 becomes shorter, and thus the arc can be quickly extinguished.

(7) Description of the Grid Leg 621

The grid 620 may include a grid leg 621. The grid leg 621 may include a grid leg 621 that extends from at least one end in the width direction and extends downward to surround the protruding contact 322 from both sides.

Figure 16:
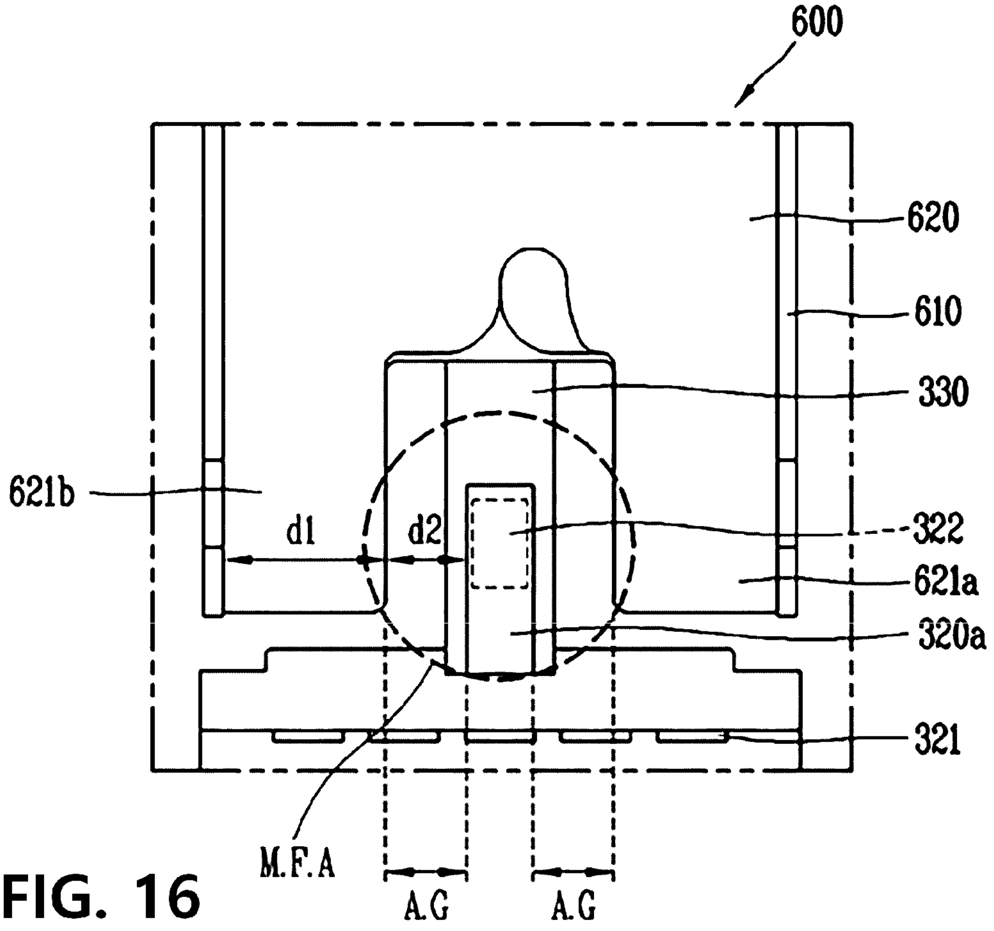
FIG. 16 is a front view illustrating the circuit breaking unit and the arc extinguishing unit shown in FIG. 15.

Specifically, referring to FIG. 16, the grid legs 621 extends downward from both ends of the grid 620. In other words, the grid leg 621 extend from both ends of the grid 620 toward the movable contact terminal 320. That is, a first grid leg 621*a* and a second grid leg 621*b* may extend downward from both sides of the protruding contact 322 to surround the protruding contact 322.

Through the above-described structure, a magnetic field induced by an arc formed between the protruding contact 322 and the low runner 330 may be easily formed in the grid 620 and the grid leg 621.

In addition, according to an embodiment of the present disclosure, the grid leg 621 extending to be adjacent to the end of the side plate 610 may serve as an existing arc guide. That is, the arc generated under the arc extinguishing unit 600 may be easily applied to the grid leg 621 extended to the end of the side plate 610 and applied to the upper portion of the grid 620 and extinguished.

Referring to FIG. 16, the grid leg 621 includes a first grid leg 621*a* extending from one end in the width direction of the grid 620, and a second grid leg 621*b* extending from the opposite side of the first grid leg 621*a*. In this case, the first grid leg 621*a* and the second grid leg 621*b* may have the same width. In addition, a grid leg groove 622 may be formed between the grid legs 621.

According to an embodiment of the present disclosure, since the widths of the first grid leg 621*a* and the second grid leg 621*b* are the same, the induced magnetic field can be stably formed.

In addition, irrespective of the position of an arc generated under the arc extinguishing unit 600, the arc can be applied along the first grid leg 621*a* and/or the second grid leg 621*b* and extinguished quickly.

The grid leg 621 extend downward along the side plate 610. Specifically, the grid leg 621 extends adjacent to the lower end of the side plate 610.

Accordingly, since the physical distance to the arc generated in the arc-generation area A.A is close, the arc can be easily applied. Thus, the arc can be quickly extinguished. In addition, an air gap A.G, which is a separation space, may be formed between the grid leg 621 and the protruding contact 322.

The sum of lengths d1 of the first grid leg 621*a* and the second grid leg 621*b* in the width direction may be equal to or greater than half of the width of the grid 620.

A magnetic field may be induced in the grid leg 621 and the grid 620 by an arc generated under the arc extinguishing unit 600. At this time, the intensity of the magnetic field induced in the grid 620 and the grid leg 621 is inversely proportional to the distance between the arc and the grid leg 621.

Thus, if the width of the grid leg 621 is small, the distance of the air gap A.G, which is a distance between the generated arc and the grid leg 621, is relatively increased. Accordingly, the intensity of the magnetic field induced in the grid 620 and the grid leg 621 is relatively weak. Therefore, the electromagnetic force applied to the arc by the magnetic field induced in the grid 620 is relatively weak.

In the present disclosure, since the sum of the lengths of the first grid leg 621*a* and the second grid leg 621*b* in the width direction is formed to be equal to or greater than half of the width of the grid 620, an induced magnetic field due to an arc generated between the protruding contact 322 and the low runner can be formed more strongly.

The length in the width direction of the upper portion and the length in the width direction of the lower portion of the first grid leg 621*a* and the second grid leg 621*b* may have the same or similar.

Specifically, referring to FIG. 16, the first grid leg 621*a* and the second grid leg 621*b* extend from the upper portion so that the length in the width direction of the upper portion and the length in the width direction of the lower portion of the first grid leg 621*a* and the second grid leg 621*b* are the same or similar.

If the widths of the first grid leg 621*a* and the second grid leg 621*b* are changed while extending downward from the grid 620, it is difficult to form a uniform magnetic field induced in the first grid leg 621*a* and the second grid leg 621*b* by the arc generated between the first grid leg 621*a* and the second grid leg 621*b*.

Thus, through the structure of the first grid leg 621*a* and the second grid leg 621*b* as described above, an induced magnetic field formed through the grid leg 621 and the grid 620 can be stably formed.

The first grid leg 621*a* and the second grid leg 621*b* may be configured to have a width wider than a length of an air gap A.G which is a distance between the first grid leg 621*a* or the second grid leg 621*b* and the protruding contact 322.

Specifically, referring to FIG. 16, a width d1 of the first grid leg 621*a* is longer than a length of the air gap A.G which is a distance between the first grid leg 621*a* and the protruding contact 322.

Through the above-described structure, the intensity of the magnetic field induced in the grid 620 and the grid leg 621 may increase.

Specifically, the intensity of the magnetic field of the grid leg 621 and the grid 620 induced by the arc is formed inversely proportional to the distance between the protruding contact 322 and the grid leg 621, that is, the length of the air gap A.G. And, when the width of the grid leg 621 is widened, the length of the air gap A.G is relatively reduced.

Thus, when the width d1 of the grid leg 621 is longer than the length of the air gap A.G, the intensity of the magnetic field induced in the grid leg 621 may be increased.

In addition, according to the above-described structure, since the length of the air gap A.G is short, the pressure applied to the generated arc may increase. Accordingly, the rising force of the arc may also increase.

A ratio (d1/d2) of the width d1 of the grid leg 621 and the length d2 of the air gap A.G is as follows.

According to an embodiment of the present disclosure, the ratio (d1/d2) of the width d1 of the first grid leg 621*a* or the second grid leg 621*b* and the length d2 of the air gap A.G may be greater than or equal to 1.

Specifically, referring to FIG. 16, the ratio (d1/d2) of the width d1 of the first grid leg 621*a* or the second grid leg 621*b* and the length d2 of the air gap A.G may be greater than or equal to 1.

If the ratio (d1/d2) of the width d1 of the first grid leg 621*a* or the second grid leg 621*b* and the length d2 of the air gap A.G is less than 1, the intensity of the magnetic field induced in the grid 620 and the grid leg 621 may be weak, and the length of the air gap A.G may be increased so that the pressure applied to the arc may not be sufficient.

Therefore, electromagnetic forces caused by the magnetic field induced by the grid leg 621 and pressures in the area where the arcs are generated may not be sufficiently applied to raise the arcs generated under the arc extinguishing unit 600 to the arc extinguishing unit 600.

As for the grid leg 621 according to an embodiment of the present disclosure, since the ratio (d1/d2) of the width d1 of the first grid leg 621*a* or the second grid leg 621*b* and the length d2 of the air gap A.G is greater than or equal to 1, a magnetic field induced in the grid leg 621 may have sufficient intensity to apply an arc generated to the arc extinguishing unit 600 by means of an electromagnetic force.

In addition, as for the grid leg 621 according to an embodiment of the present disclosure, since the ratio (d1/d2) of the width d1 of the first grid leg 621*a* or the second grid leg 621*b* and the length d2 of the air gap A.G is greater than or equal to 1, an air gap A.G between the grid leg 621 and the protruding contact 322 is formed short, so that sufficient pressure can be formed to raise the generated arc to the arc extinguishing unit 600.

Figure 6:
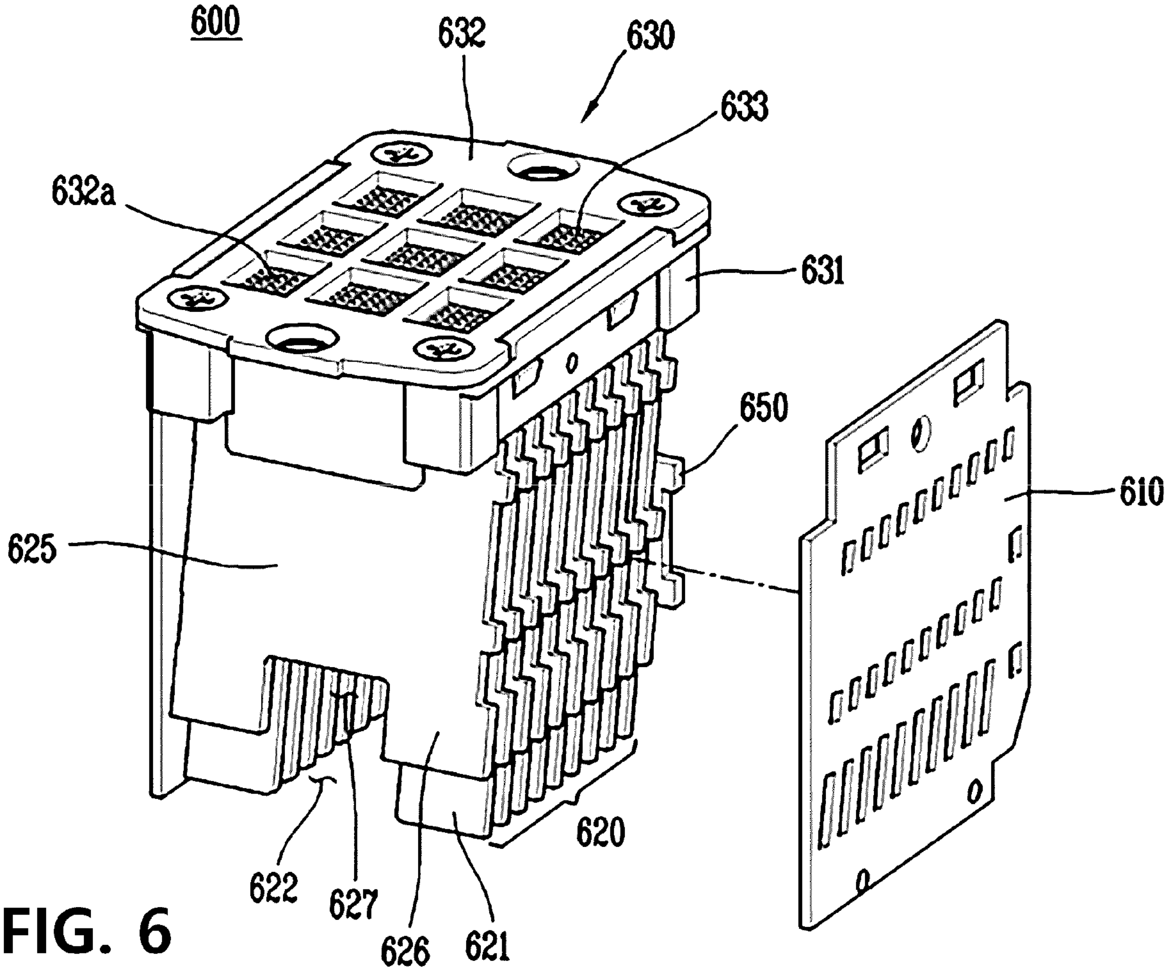
FIGS. 6 and 7 are perspective views illustrating an exemplary embodiment of an arc extinguishing unit provided in the air circuit breaker of FIG. 1 from different directions.
Figure 7:
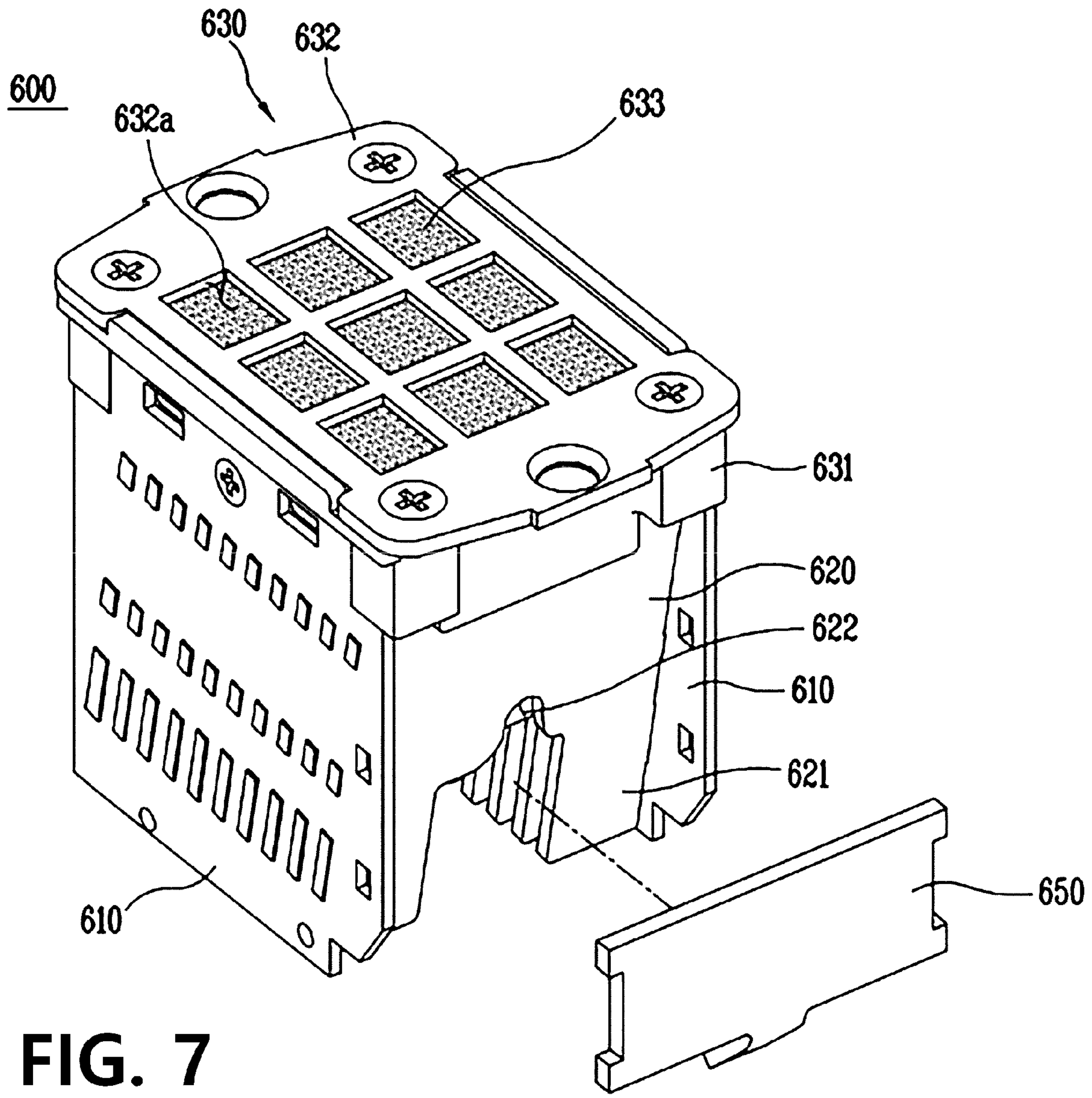
Figure 8:
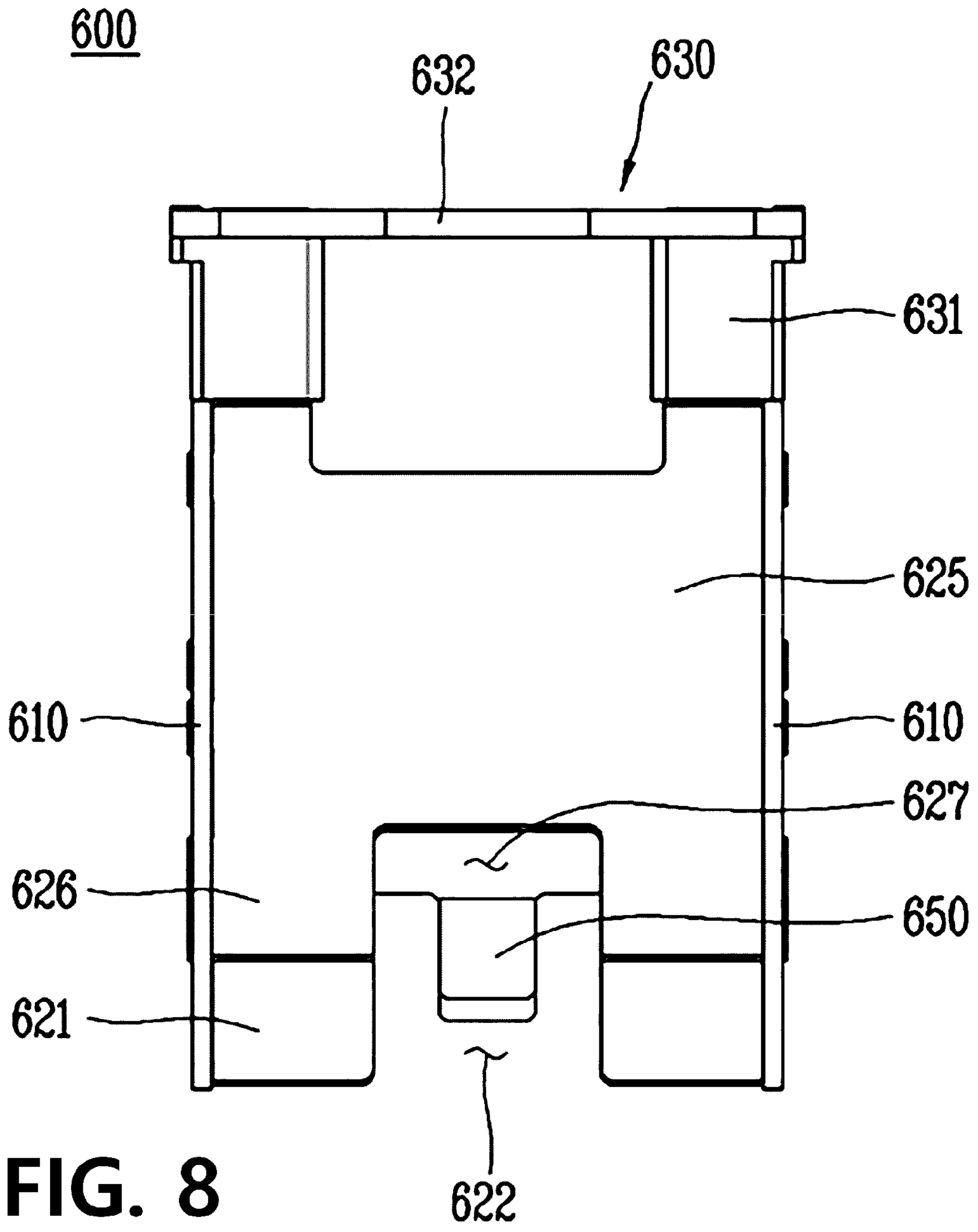
FIG. 8 is a front view illustrating an exemplary embodiment of the arc extinguishing unit shown in FIG. 6.
Figure 9:
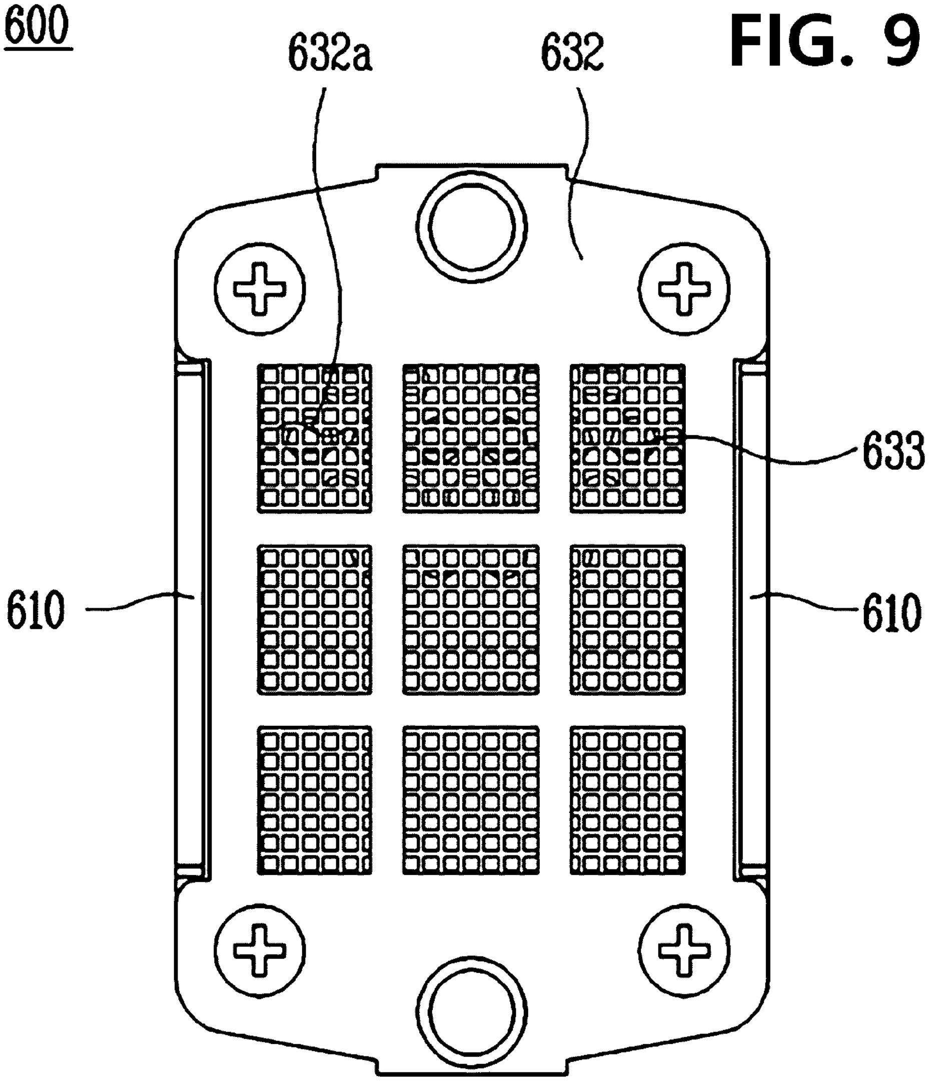
FIG. 9 is a plan view illustrating an exemplary embodiment of the arc extinguishing unit shown in FIG. 6.
Figure 10:
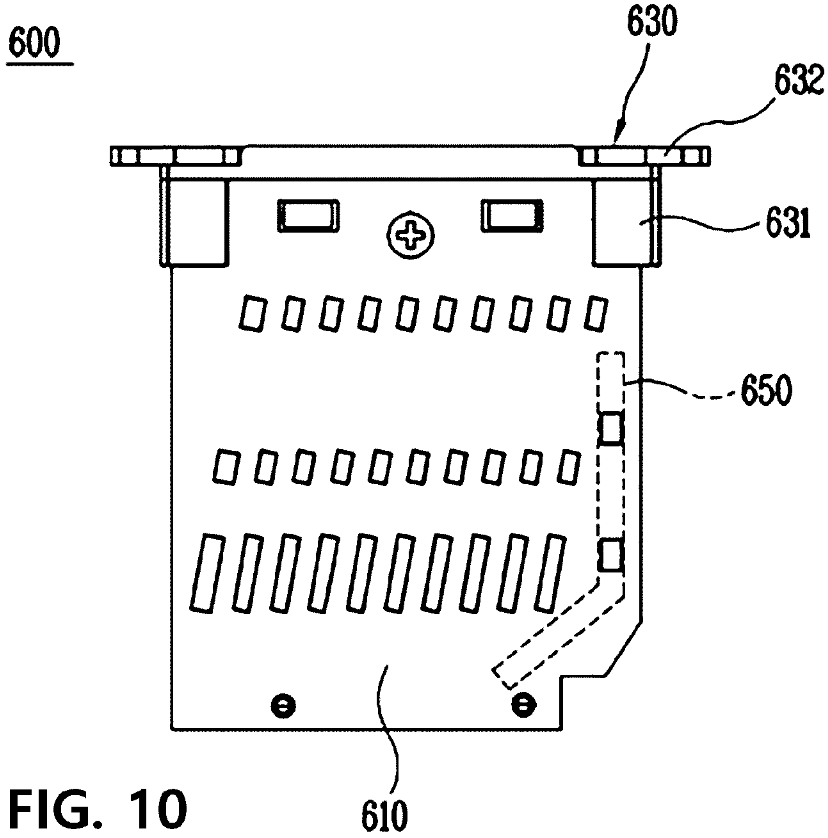
FIG. 10 is a side view illustrating an exemplary embodiment of the arc extinguishing unit shown in FIG. 6.

Referring to FIG. 6, an outermost grid 625 having a relatively short length may be included among the grids 620.

The outermost grid 625 is a grid 620 disposed closest to the fixed contact 311 among a plurality of grids 620.

By forming the length of the outermost grid 625 shorter, it is possible to secure a space required for contacting and separating the fixed contact terminal 310 and the movable contact terminal 320 disposed adjacent to the outermost grid 625 or a space required for arranging various components for inducing an arc.

The outermost grid 625 may also be provided with a grid leg 626. The grid leg 626 of the outermost grid 625 may be formed to be shorter than the grid leg 621 of the grid 620. A grid leg groove 627 may be formed between the grid legs 626 of the outermost grid 625.

In an embodiment of the present disclosure, the protruding contact 322 may protrude from an upper side of the centrally disposed movable contact 321 among the plurality of movable contacts 321.

An air gap A.G may be formed between the protruding contact 322 and the grid leg 621. By forming an air gap A.G between the protruding contact 322 and the grid leg 621, a pressure applied to an arc generated between the protruding contact 322 and the low runner 330 may be increased, and thus a force to rise may be applied to the generated arc.

An air gap A.G is formed in the area where the arc is generated, thereby reducing the space of the arc-generation area, and accordingly, a pressure applied to the generated arc is increased, so that the generated arc may be subjected to a rising force. Accordingly, the arc can be more easily applied to the grid 620 or grid leg 621, so that it can be quickly extinguished.

(8) Description of the Magnet Unit 600

Referring to FIGS. 17 to 25, the circuit breaking unit 300 according to an embodiment of the present disclosure may include a magnet unit 500.

Referring to FIG. 12, the magnet unit 500 is disposed between the low runner 330 and the fixed contact terminal 310. The magnet unit 500 may be formed to fill a space part formed between the low runner 330 and the fixed contact terminal 310.

In another embodiment, the magnet unit 500 may be formed such that a portion of the space part between the low runner 330 and the fixed contact terminal 310 is empty. Specifically, when the space part is formed in a shape other than a rectangular hexagon, the magnet 510 filled in the space part may be formed in a rectangular hexagon shape. Accordingly, an empty space may be partially formed in the space part, filled with the magnet 510, between the low runner 330 and the fixed contact terminal 310.

Meanwhile, in another embodiment of the present disclosure, the magnet unit 500 may protrude and extend toward either of the two side directions of the low runner 330. Specifically, the magnet 510 of the magnet unit 500 may be wider than the width of the low runner 330. Accordingly, the intensity of the magnetic field M.F applied to the magnetic field area M.F.A may be increased.

In addition, in another embodiment of the present disclosure, the magnet unit 500 may protrude and extend toward the front of the low runner 330. That is, the magnet 510 of the magnet unit 500 may be wider than the width of the low runner 330 and may extend and protrude in a forward direction of the low runner 330, that is, in a direction toward the movable contact 321. Through this, as the distance between the magnet 510 and the magnetic field area M.F.A decreases, the intensity of the magnetic field M.F applied to the magnetic field area M.F.A may be increased.

Thus, the intensity of the magnetic field M.F forming the arc-guided path A.P may be enhanced. As a result, since the intensity of the electromagnetic force is also strengthened, the generated arc can be rapidly moved toward the arc extinguishing unit 600 along the arc-guided path A.P and extinguished.

However, in the above-described embodiment, in the magnet unit 500 protruding from the side of the low runner 330 or toward the front surface of the low runner 330, the protruding length toward the side of the low runner 330 or the protruding degree toward the front surface of the low runner 330 may be adjusted so as not to interfere with the grid 620 or the movable contact terminal 320.

Figure 17:
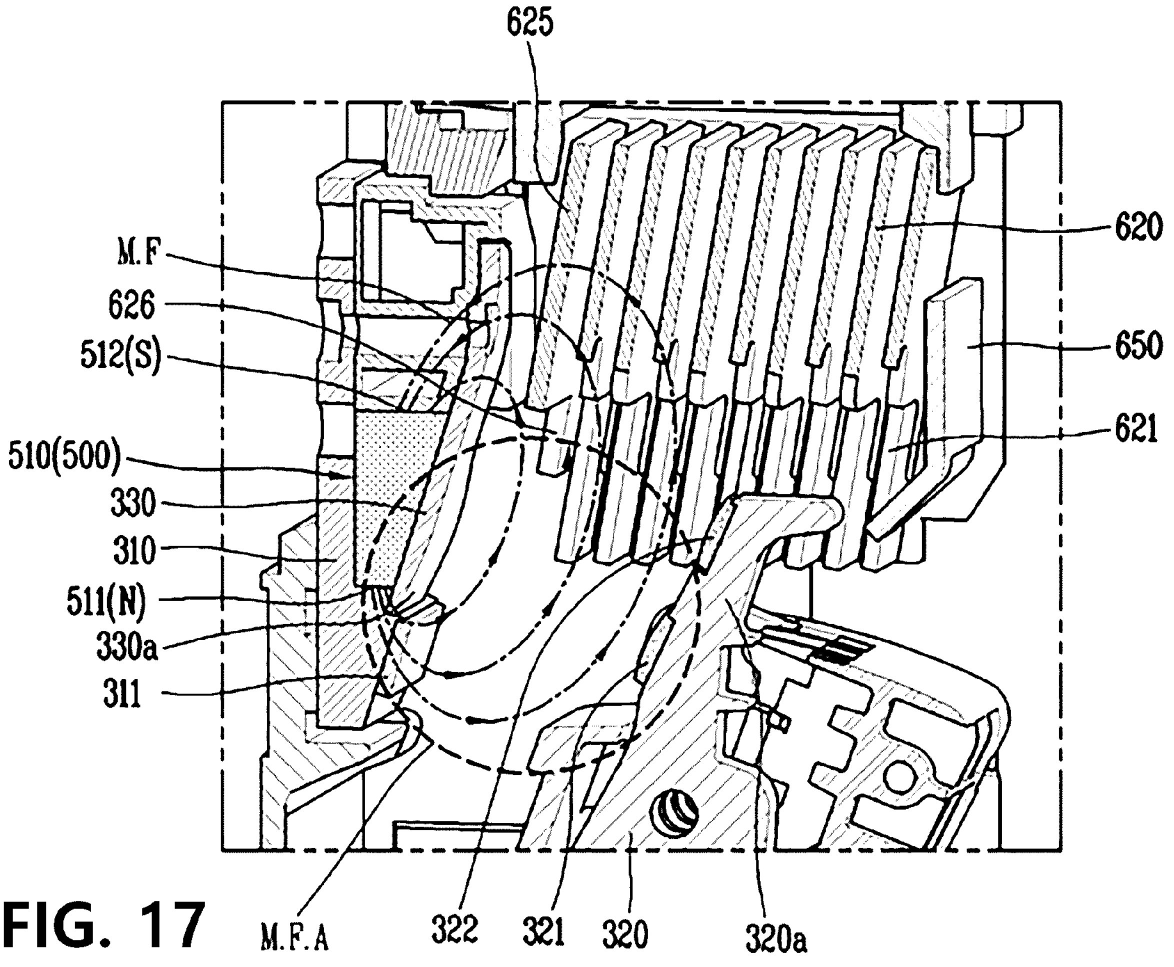
FIG. 17 is a perspective view illustrating a magnetic field M.F and a Magnetic field area M.F.A in a state in which the circuit breaking unit and the arc extinguishing unit shown in FIG. 14 are disposed in a trip state.

Referring to FIG. 17, the magnet unit 500 forms a magnetic field M.F between the fixed contact 311 and the movable contact 321. The magnetic field formed by the magnet unit 500 may apply electromagnetic force to the arc to guide to the outside the path of the arc generated when the fixed contact 311 and the movable contact 321 are separated.

The magnetic field area M.F.A formed by the magnet unit 500 may be between the fixed contact 311 and/or the low runner 330 and the movable contact 321. However, this is only an area set up to help to understand. That is, it means a space in which the magnetic field M.F formed by the magnet unit 500 directly affects the arc in the path where the arc is formed.

A magnet 510 includes a first surface 511 and a second surface 512. The magnet 510 includes a first surface 511 magnetized to the N pole and a second surface 512 magnetized to the S pole, disposed on opposite sides of each other, and the first surface 511 may be disposed in a direction adjacent to the fixed contact 311.

Specifically, referring to the drawings, the first surface 511 magnetized to the N pole may be disposed toward the lower side, and the second surface 512 magnetized to the S pole may be disposed toward the upper side.

Thus, the direction of the magnetic field M.F. may be formed in a direction in which lines of magnetic force come out from the first surface 511 and enter the second surface 512. Specifically, referring to FIG. 17, the direction of the magnetic field M.F. may be formed in a direction from the bottom to the top in the arc-generation area. Through this arrangement, the magnetic field M.F applied to the magnetic field area M.F.A generated by the magnet unit 500 may be directed upward.

Meanwhile, unlike the above described in other embodiments, the first surface 511 magnetized to the N pole may be disposed toward the upper side, and the second surface 512 magnetized to the S pole may be disposed toward the lower side.

In this case, a magnetic field formed by the magnet unit 500 may be formed in a direction from the arc extinguishing unit 600 toward the movable contact terminal 320. That is, a magnetic field formed by the magnet unit 500 may be formed in a direction from top to bottom with respect to FIG. 17.

The shape of the magnet unit 500 may be made to fill a space formed between the low runner 330 and the fixed contact terminal 310.

Figure 25:
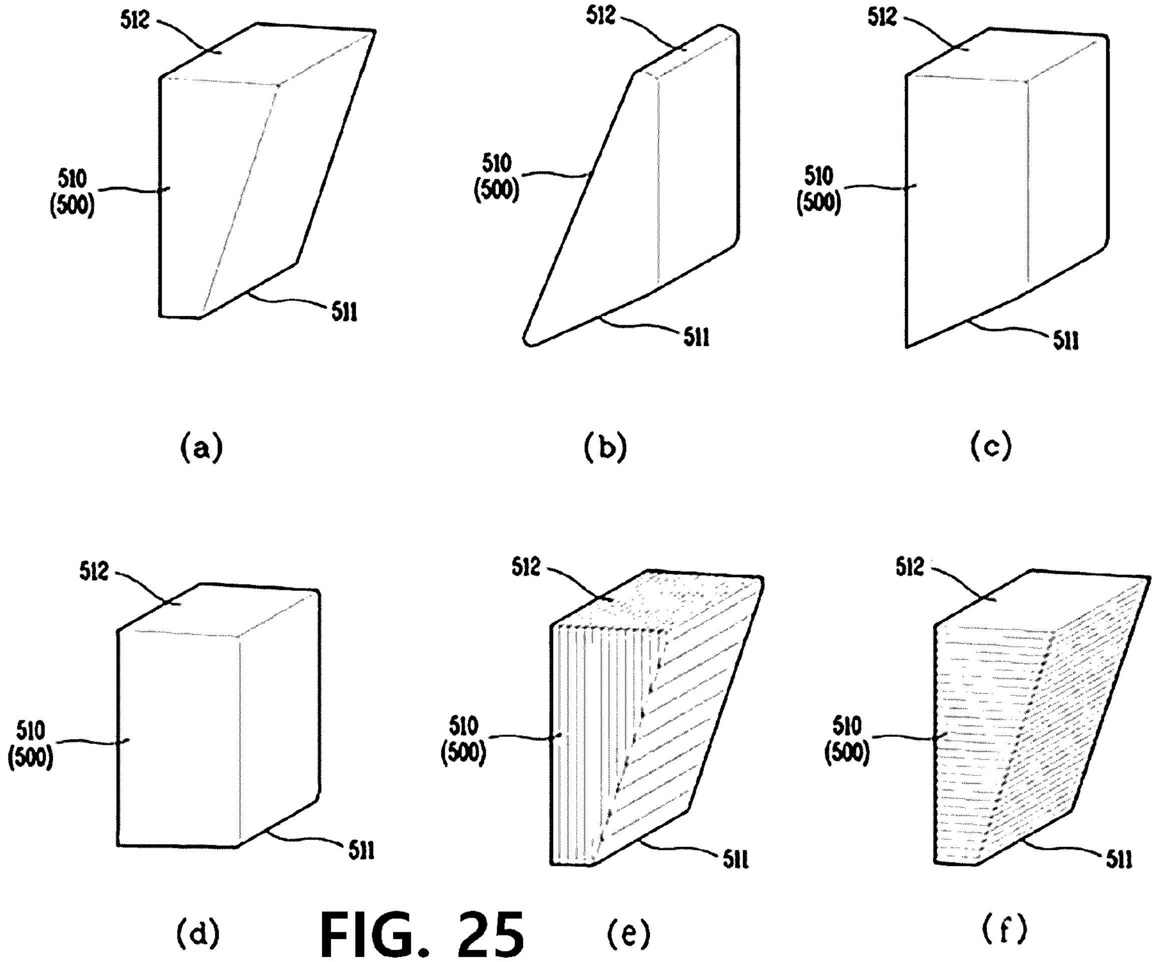
FIG. 25 is a view for illustratively explaining the shape of a magnet formed according to various embodiments of the present disclosure.

For example, FIG. 25 is a view for illustratively explaining the shape of a magnet 510 formed according to various embodiments of the present disclosure.

Specifically, (a) is the shape of the magnet 510 disposed between the fixed contact terminal 310 and the low runner 330 when the fixed contact terminal 310 is formed vertically and the low runner 330 is formed obliquely.

(b) is the shape of the magnet 510 disposed between the fixed contact terminal 310 and the low runner 330 when the fixed contact terminal 310 extends obliquely, that is, the fixed contact terminal 310 extends at a predetermined angle toward the arc extinguishing unit 600, and the low runner 330 has a bent part 331.

(c) is the shape of the magnet 510 disposed between the fixed contact terminal 310 and the low runner 330 when the fixed contact terminal 310 is formed vertically and the low runner 330 has a bent part 331.

The magnet unit 500 may include a plurality of magnets 510 segmented into a plurality of segments, and the plurality of magnets 510 may be formed by stacking them in a horizontal or vertical direction.

(d) is a magnet 510 in the shape of a rectangular parallelepiped whose lower and upper surfaces are the same size. In this case, a separation space may be formed between the magnet 510 and the low runner 330.

(e) shows a case in which magnets 510 are vertically stacked in the shape of (a).

(f) shows the shape of the magnet 510 when the magnets 510 are horizontally stacked in the shape of (a).

Even in cases (b) and (c), the magnets 510 may be stacked horizontally or vertically.

Figure 24:
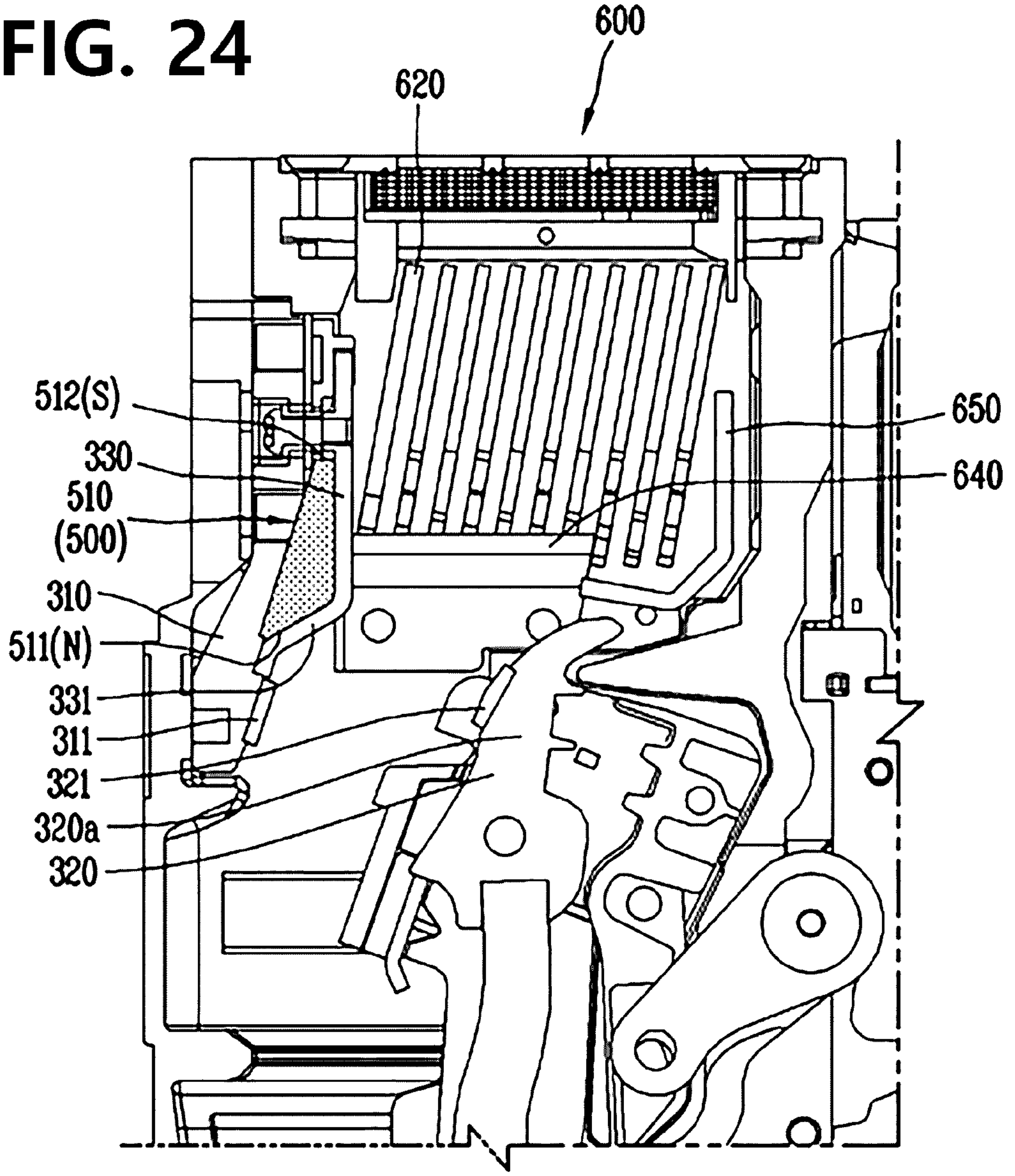
FIG. 24 is a cross-sectional view illustrating a state in which a rear cover is removed from an air circuit breaker according to another exemplary embodiment of the present disclosure.

Meanwhile, referring to FIG. 24 according to another embodiment of the present disclosure, the fixed contact terminal 310 may obliquely extend toward the arc extinguishing unit 600 and the low runner 330 may obliquely extend toward the arc extinguishing unit 600.

The low runner 330 may include a bent part 331 formed between both ends and configured to change an angle between the low runner 330 and the fixed contact terminal 310.

Specifically, as shown in FIG. 24, the low runner 330 may include a bent part 331 that changes an angle formed with the fixed contact terminal 310.

The bent part 331 not only can firmly support the magnet 510 disposed inside, but also the low runner 330 has the bent part 331, so that the width of the lower side of the space part between the low runner 330 and the fixed contact terminal 310 may be formed wide.

Accordingly, the area of the first surface 511 of the magnet 510 inserted into the space part may be widened, and the direction in which the first surface 511 of the magnet 510 faces may be configured to face the magnetic field area M.F.A. Accordingly, the magnitude of the magnetic field M.F applied to the magnetic field area M.F.A may increase. Accordingly, the Lorentz force applied to the arc increases, and the arc can be extinguished more quickly.

(9) Description of the Arc-Guided Path A.P by Magnetic Field

Referring to FIGS. 18 to 23, a magnetic field formed in the circuit breaking unit 300, electromagnetic force applied to the arc, and an arc-guided path A.P will be described below.

In the following description, the part marked with "O" means that the current (arc) flows in a direction of coming out of the paper. In addition, the part marked with "(x)" means that the current (arc) flows in a direction of entering toward the paper. In this case, the current may mean an arc.

DC air circuit breaker 10 according to an embodiment of the present disclosure breaks direct current flowing from the movable contact 321 (the protruding contact 322) to the fixed contact 311 (the low runner 330), or vice versa. Therefore, the arc generated when tripped is also formed in the same direction as the energized direction.

Referring to FIG. 17, in a trip state in which the fixed contact 311 and the movable contact 321 are spaced apart from each other, a magnetic field area M.F.A in which an electromagnetic force is applied to an arc generated is formed in a space between the low runner 330 and the protruding contact 322 and a space below the grid 620.

The magnetic field area M.F.A may include a magnetic field formed by a permanent magnet and a magnetic field formed by a ferromagnetic body (grid leg 621) disposed around an area where an arc is generated.

For example, the magnetic field affecting the arc may be a magnetic field formed by the magnet unit 500. The magnetic field formed by the magnet unit 500, that is, by a permanent magnet, may form a direction of a magnetic field coming out of the N pole and entering the S pole. With this magnetic field, the arc may be subjected to an electromagnetic force due to the Lorentz force.

In addition, the ferromagnetic body disposed around the area where the arc is generated may be induced to form a magnetic field in a direction obstructing the magnetic field caused by the current of the generated arc. This can be referred to as an induced magnetic field of a ferromagnetic body.

The arc may be subjected to an electromagnetic force by Lorentz force by a magnetic field formed by a permanent magnet or an induced magnetic field by a ferromagnetic body.

The direction of the electromagnetic force received by the generated arc can be explained by Fleming's left-hand rule. According to Fleming's left-hand rule, when you point the third finger in the direction of the current (I) and the second finger in the direction of the magnetic field (B), the direction of the thumb is the direction of the electromagnetic force (F). Here, the angle between each finger should be a right angle.

At this time, according to Fleming's left-hand rule, the arc may move along the direction of the electromagnetic force received by the arc. This motion of the arc may be referred to as an arc-guided path (A.P).

Figure 18:
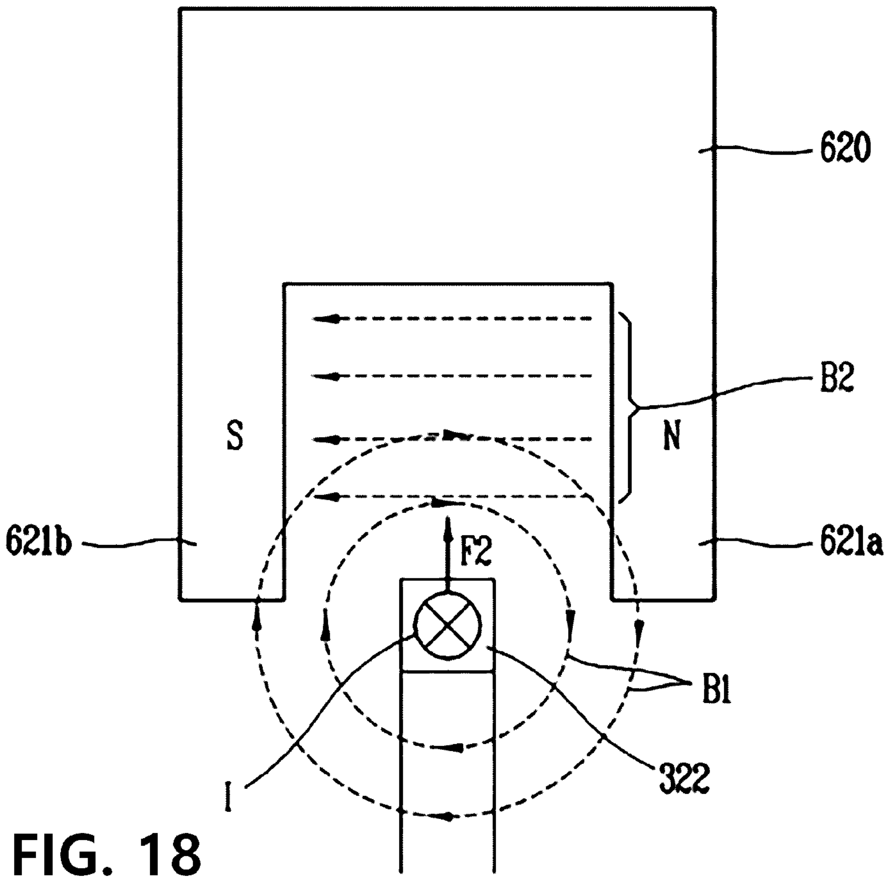
FIGS. 18 to 23 are conceptual diagrams for explaining an arc-guided path A.P formed by a magnetic field of a grid leg and a magnetic field of a magnet unit when an arc is generated.

Referring to FIG. 18, a magnetic field is induced in the grid leg 621 by an arc generated under the arc extinguishing unit 600, and this is a diagram for explaining the direction in which an electromagnetic force by the magnetic field induced in the grid leg 621 is applied to the generated arc.

Referring to FIG. 18, the direction of the current of the arc generated when the air circuit breaker 10 is tripped flows from the movable contact 321 (the protruding contact 322) toward the fixed contact 311 (the low runner 330). That is, the current (arc) is formed in a direction of entering toward the paper.

In this case, when considering the current direction of the arc, a magnetic field B1 is formed in a direction surrounding the arc generated by Ampere's right-handed screw rule, that is, in a clockwise direction with respect to the drawing.

A magnetic field B2 induced in a direction obstructing the magnetic field B1 generated by the arc is generated in the grid leg 621. At this time, instantaneously, the first grid leg 621*a* may be magnetized to the N pole, and the second grid leg 621*b* may be magnetized to the S pole.

And, by the induced magnetic field B2, the arc is subjected to an electromagnetic force F2 toward the arc extinguishing unit 600, i.e., the upper side, according to Fleming's left-hand rule.

Figure 19:
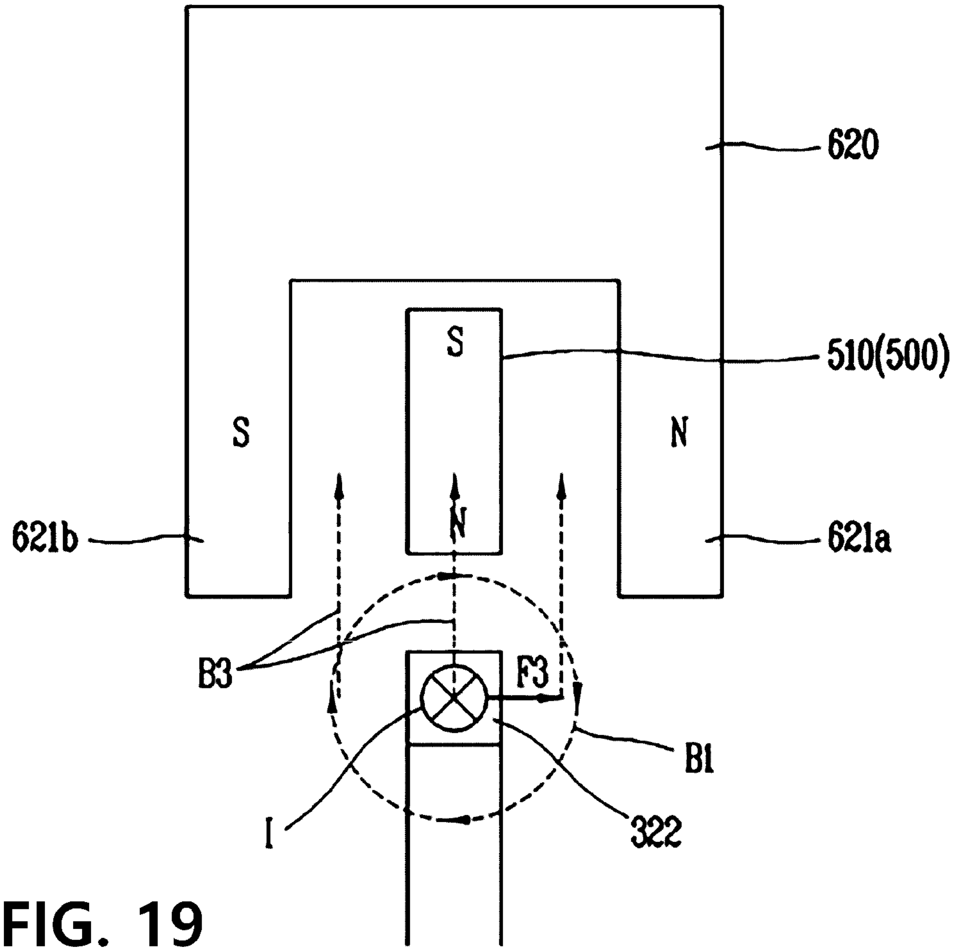

Meanwhile, referring to FIG. 19, the arc may be subjected to an electromagnetic force due to a magnetic field B3 formed by the magnet unit 500.

Specifically, the magnetic field B3 formed by the magnet unit 500 is in an upward direction, that is, a direction toward the arc extinguishing unit 600.

According to Fleming's left-hand rule in consideration of the current direction of the arc and the direction of the magnetic field B3 formed by the magnet unit 500, the arc is subjected to an electromagnetic force F3 in the right direction. That is, the direction of the electromagnetic force F3 received by the arc by the magnetic field B3 of the magnet unit 500 is the rightward direction.

Figure 20:
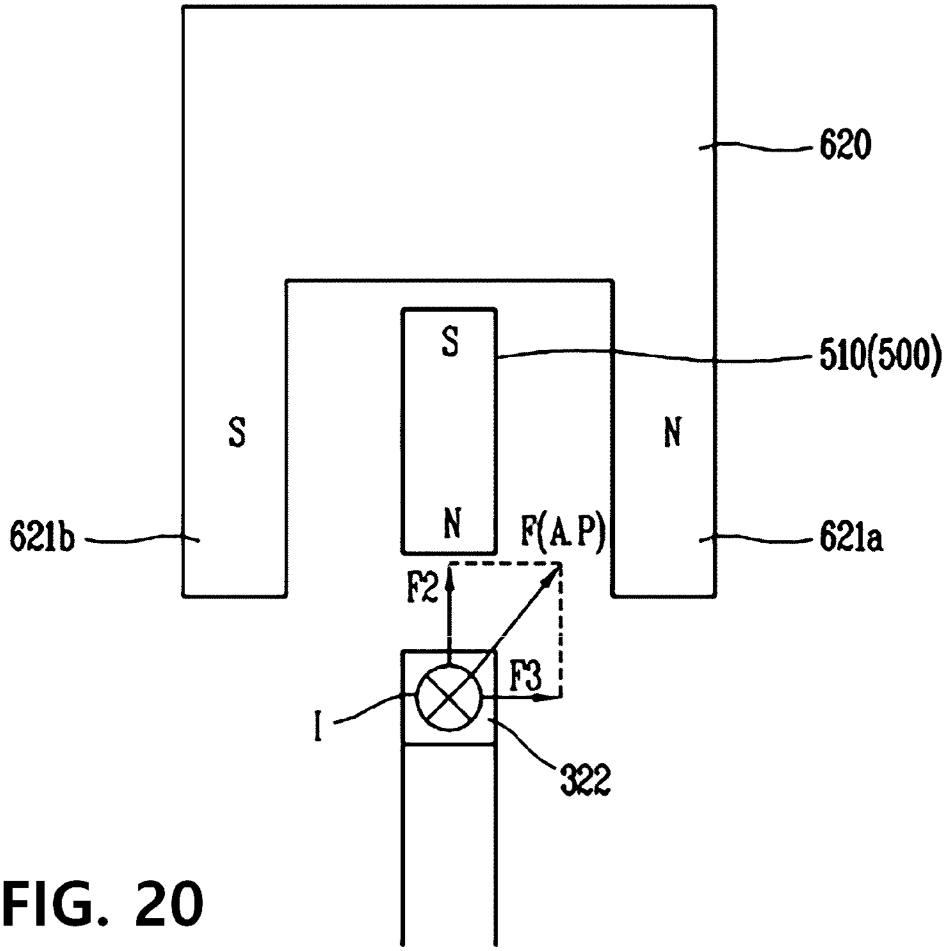

Referring to FIG. 20, the net force of the electromagnetic force applied to the arc is a resultant force F of the electromagnetic force F2 by the magnetic field B2 induced by the grid leg 621 and the electromagnetic force F3 by the magnetic field B3 by the magnet unit 500. That is, an arc-guided path A.P applied to the arc may be formed in a direction toward the upper right side.

As such, the arc may be applied toward the grid 620 or the grid leg 621 of the arc extinguishing unit 600 by forming the arc-guided path A.P.

The arc extinguishing unit and the air circuit breaker 10 including the same according to an embodiment of the present disclosure form an arc-guided path A.P toward the grid 620 and/or the grid leg 621 through the electromagnetic force applied to the arc by the magnetic field induced in the grid leg 621 and the magnetic field of the magnet unit 500. Through this, the arc, which has insufficient force to rise due to the small current, can be raised by receiving the electromagnetic force. Accordingly, the arc can be extinguished more quickly.

In addition, as described above, by forming the air gap A.G between the protruding contact 322 and the grid leg 621, the pressure applied to the generated arc increases, so that a force for the arc to rise toward the arc extinguishing unit 600 is generated.

Therefore, the force applied to the arc is the electromagnetic force F2 due to the magnetic field induced in the grid leg 621, the electromagnetic force F3 due to the magnetic field of the magnet unit 500, and the rising force due to the pressure caused by the air gap A.G. Accordingly, the arc can be more easily applied to the arc extinguishing unit 600.

Figure 21:
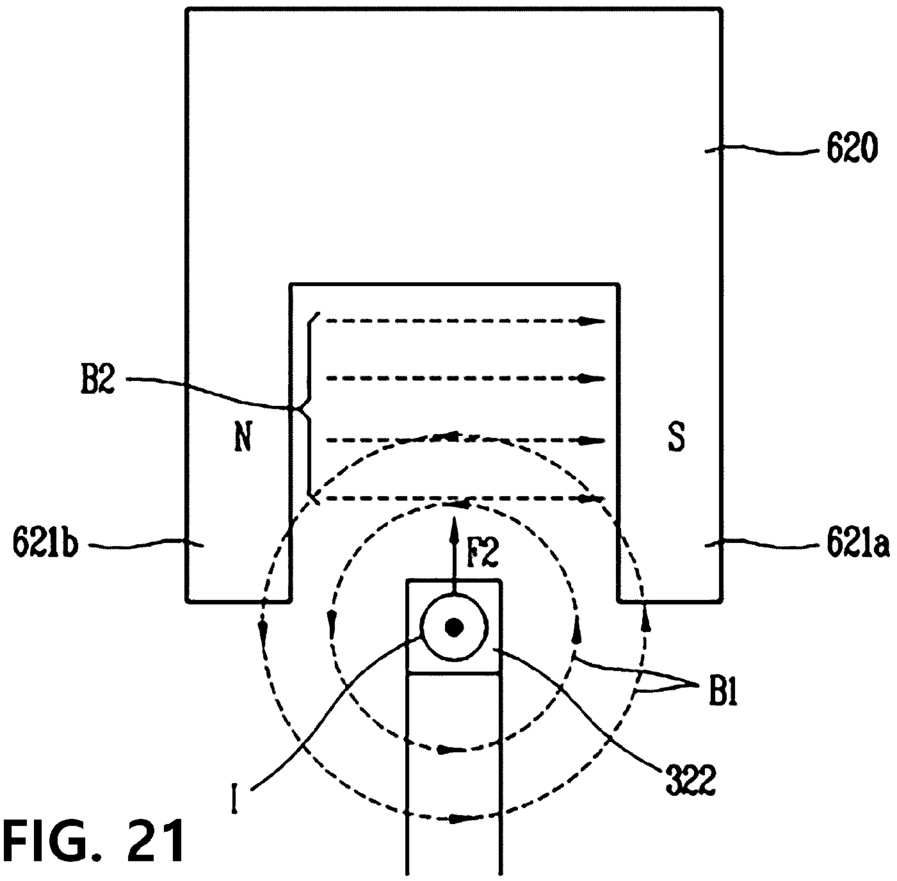

Referring to FIG. 21, the direction of the current of the arc generated when the air circuit breaker 10 is tripped flows from the fixed contact 311 (the low runner 330) toward the movable contact 321 (the protruding contact 322). That is, the current (arc) is formed in a direction of coming out of the paper.

In this case, when considering the current direction of the arc, a magnetic field B1 is formed in a direction surrounding the arc generated by Ampere's right-handed screw rule, that is, in a counterclockwise direction with respect to the drawing.

A magnetic field B2 induced in a direction obstructing the magnetic field B1 generated by the arc is generated in the grid leg 621. At this time, instantaneously, the second grid leg 621*b* may be magnetized to the N pole, and the first grid leg 621*a* may be magnetized to the S pole.

By the magnetic field B2 induced in the grid leg 621, the arc is subjected to an electromagnetic force F2 toward the arc extinguishing unit 600, i.e., the upper side, according to Fleming's left-hand rule.

Figure 22:
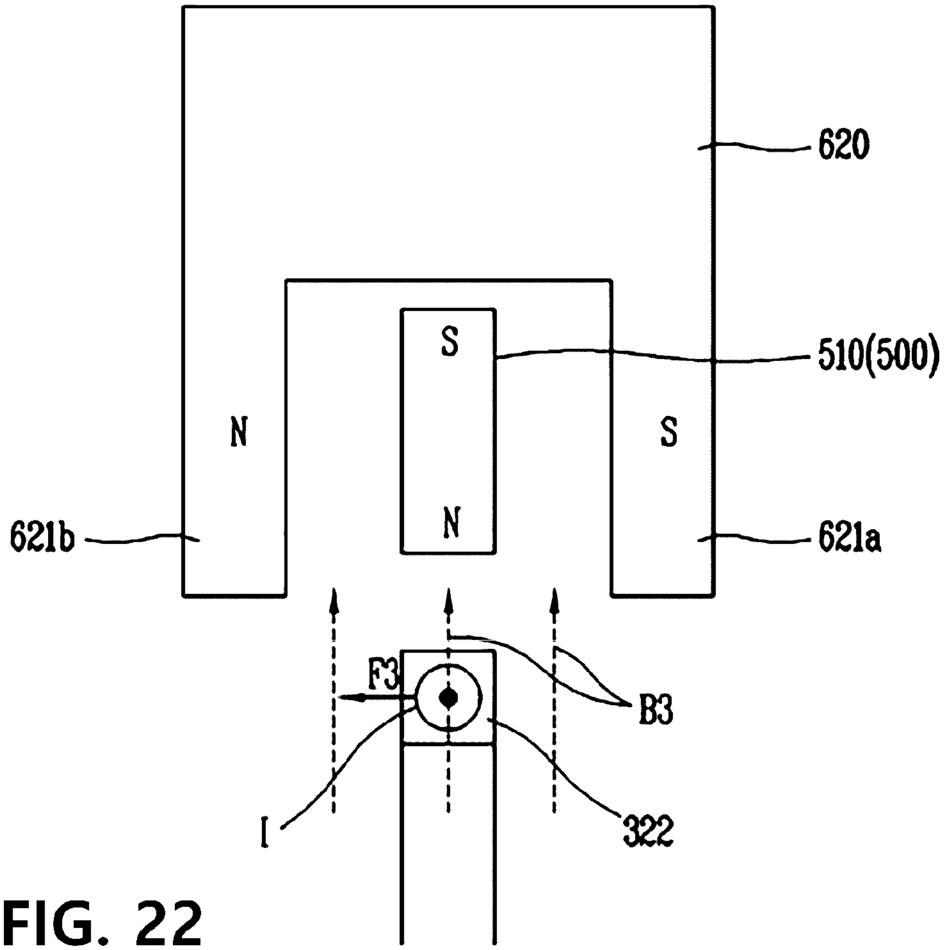

Referring to FIG. 22, the magnetic field B3 formed by the magnet unit 500 is formed upward with respect to the arc. According to Fleming's left-hand rule in consideration of the current direction of the arc and the direction of the magnetic field B3 of the magnet unit 500, the electromagnetic force F3 applied to the arc by the magnetic field B3 formed by the magnet unit 500 is in the left direction.

Figure 23:
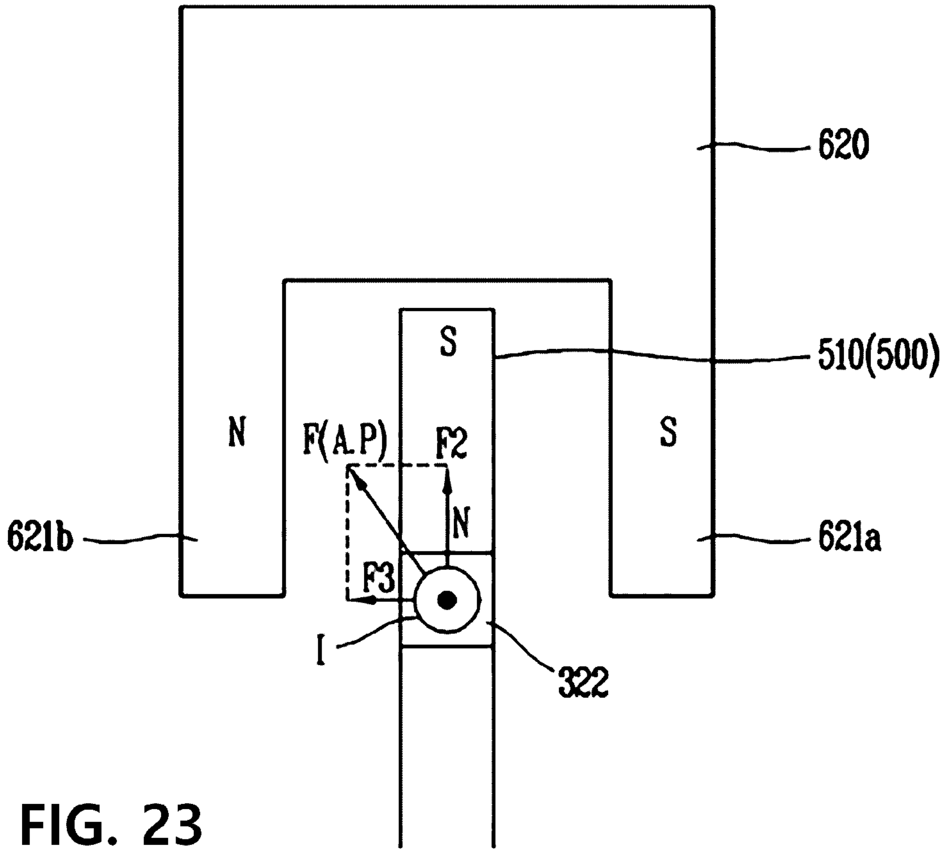

Referring to FIG. 23, the net force of the electromagnetic force applied to the arc is a resultant force F of the electromagnetic force F2 by the magnetic field B2 induced by the grid leg 621 and the electromagnetic force F3 by the magnetic field B3 by the magnet unit 500. That is, an arc-guided path A.P applied to the arc may be formed in a direction toward the upper left side.

As the electromagnetic force is applied to the arc to move along the arc-guided path A.P, the arc may be applied toward the grid 620 or the grid leg 621 of the arc extinguishing unit 600.

The air circuit breaker 10 according to an embodiment of the present disclosure forms an arc-guided path A.P toward the grid 620 through the electromagnetic force applied to the arc by the magnetic field B2 induced in the grid leg 621 and the magnetic field B3 by the magnet unit 500. Through this, the arc, which has insufficient force to rise due to the small current, can be raised by receiving the electromagnetic force. Accordingly, the arc can be extinguished more quickly.

In addition, as described above, by forming the air gap A.G between the protruding contact 322 and the grid leg 621, the pressure applied to the generated arc increases, so that a force for the arc to rise toward the arc extinguishing unit 600 is generated.

Therefore, the force applied to the arc is the electromagnetic force F2 due to the magnetic field induced in the grid leg 621, the electromagnetic force F3 due to the magnetic field of the magnet unit 500, and the rising force due to the pressure caused by the air gap A.G. Accordingly, the arc can be more easily applied to the arc extinguishing unit 600.

Meanwhile, unlike the above described in other embodiments, the first surface 511 magnetized to the N pole may be disposed toward the upper side, and the second surface 512 magnetized to the S pole may be disposed toward the lower side.

Accordingly, the magnetic field formed by the magnet unit 500 may be opposite to that in the above-described embodiment. Specifically, the magnetic field formed by the magnet unit 500 may be formed in the direction of the movable contact 321 and the fixed contact 311 from the arc extinguishing unit 600 centering on the arc.

In this case, the electromagnetic force received by the arc due to the magnetic field formed by the magnet unit 500 is in a direction opposite to that in the above-described embodiment.

However, even in this case, regardless of the current direction of the arc, the direction of the electromagnetic force by the magnetic field of the magnet unit 500 is such that the arc is directed towards the grid leg 621 and/or the grid 620. Specifically, even if the N pole and the S pole of the magnet unit 500 are arranged opposite to the above-described embodiment, the electromagnetic force received by the arc due to the magnetic field formed by the magnet unit 500 may be right or left.

3. Description of the Air Circuit Breaker 10 According to Another Embodiment of the Present Disclosure Hereinafter, an air circuit breaker 10 according to an embodiment different from the above-described embodiment will be described with reference to FIGS. 26 to 32.

The air circuit breaker 10 according to the present embodiment includes a cover unit 100, a driving unit 200, a circuit breaking unit 300, a magnet unit 500, and an arc extinguishing unit 600.

The structures and functions of the cover unit 100, the driving unit 200, and the magnet unit 500 of the present embodiment are the same as those of the cover unit 100, the driving unit 200, and the magnet unit 500 of the above-described embodiment.

However, the circuit breaking unit 300 and the arc extinguishing unit 600 of the present embodiment are different from the circuit breaking unit 300 and the arc extinguishing unit 600 of the above-described embodiment in their functions and structures. Hereinafter, the air circuit breaker 10 according to the present embodiment will be described focusing on the above difference.

The circuit breaking unit 300 will be described later, and the arc extinguishing unit 600 will be described first.

(1) Description of the Arc Extinguishing Unit 600

Figure 26:
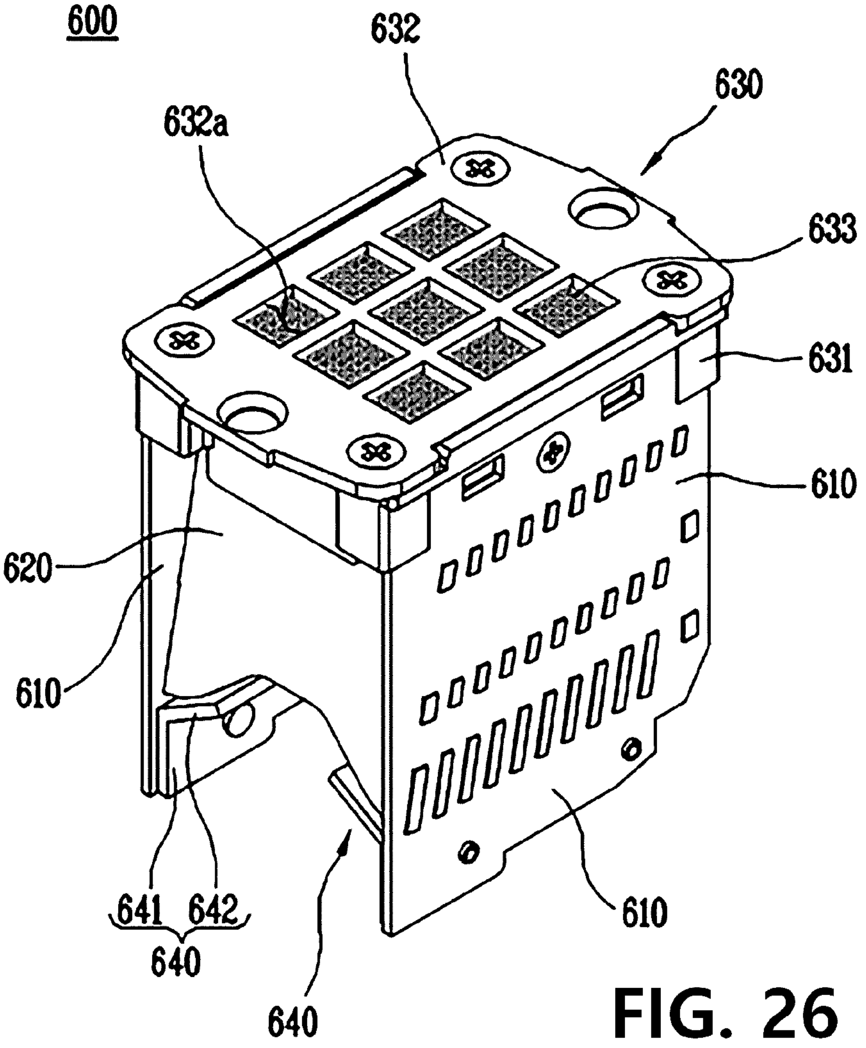
FIGS. 26 and 27 are perspective views illustrating another exemplary embodiment of an arc extinguishing unit provided in the air circuit breaker of FIG. 1 from different directions.
Figure 27:
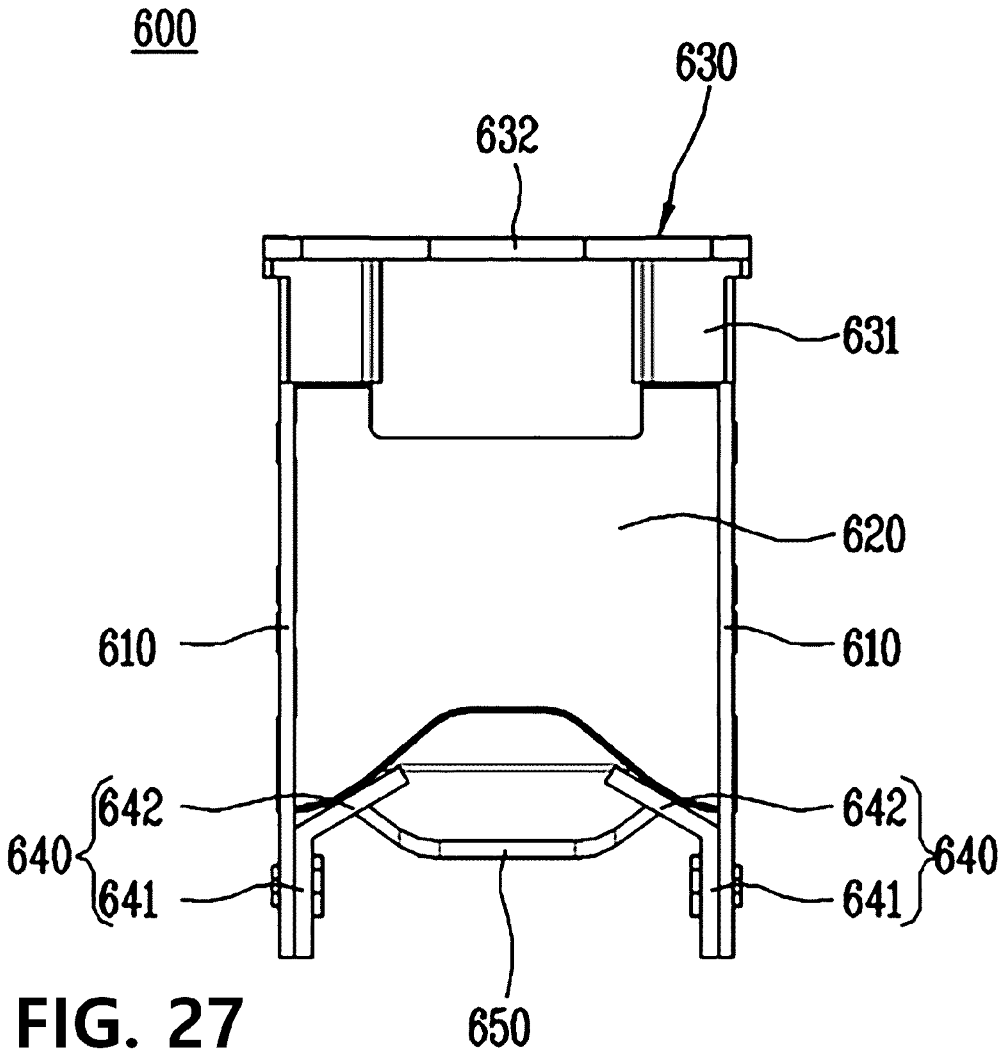

Referring to FIGS. 26 to 27, the arc extinguishing unit 600 according to the present embodiment includes a side plate 610, a grid 620, a grid cover 630, an arc guide 640, and an arc runner 650.

A plurality of through holes are formed in the side plate 610. The grid 620 and the arc runner 650 may be inserted and coupled to some of the through holes. In addition, fastening members for fastening the grid cover 630 and the arc guide 640 to the side plate 610 may be coupled through some of the other through holes.

The side plate 610 is coupled to the arc guide 640. Specifically, the arc guide 640 is coupled to the lower side of the side plate 610, that is, to one side opposite to the grid cover 630. The above coupling may be achieved by a separate fastening member.

The arc guide 640 guides a generated arc so that the arc flows toward the grid 620. It is possible to prevent damage to the side plate 610 by flowing the generated arc toward the side plate 610 by the arc guide 640.

The arc guide 640 is located on one side of the side plate 610 facing the fixed contact 311 and the movable contact 321. In the illustrated embodiment, the arc guide 640 is located on the lower side of the side plate 610.

A plurality of arc guides 640 may be provided. The plurality of arc guides 640 may be coupled to each side plate 610. In the illustrated embodiment, two arc guides 640 are provided and coupled to each side plate 610, respectively. The two arc guides 640 are arranged to face each other.

The arc guide 640 is coupled to the side plate 610. The above coupling may be achieved by a separate fastening member.

The arc guide 640 may be formed of a heat-resistant material. This is to prevent damage and shape deformation due to the generated arc. In an embodiment, the arc guide 640 may be formed of a ceramic material.

The arc guide 640 is disposed to partially encase a peak portion formed on opposite sides of the grid 620, i.e., on the end in the left-right direction in the illustrated embodiment. Accordingly, arcs guided by the arc guide 640 may not be concentrated on any one part of the grid 620.

The arc guide 640 may extend in the extension direction of the side plate 610, i.e., in the front-rear direction in the illustrated embodiment. That is, the arc guide 640 may extend between the grid 620 located at the frontmost side and the grid 620 located at the rearmost side.

The arc guide 640 includes a first extension part 641 and a second extension part 642.

The first extension part 641 is a portion where the arc guide 640 is coupled to the side plate 610. The first extension part 641 is located on one side of the side plate 610 facing the fixed contact terminal 310, i.e., on the lower side in the illustrated embodiment. The first extension part 641 may be coupled to the side plate 610 by a fastening member.

The first extension part 641 extends in a direction toward the grid 620, i.e., upward in the illustrated embodiment. In an embodiment, the first extension part 641 may extend while being in contact with the side plate 610. In another embodiment, the first extension part 641 may extend parallel to the side plate 610.

A second extension part 642 extends from an end of the first extension part 641. The second extension part 642 is formed to partially encase a peak portion formed at an end portion of the grid 620 in the left-right direction. The second extension part 642 is continuous with the first extension part 641 at a predetermined angle. In an embodiment, the second extension part 642 may extend, forming an obtuse angle with the first extension part 641.

In another embodiment, the second extension part 642 may extend parallel to a peak portion formed at an end portion of the grid 620 in the left-right direction.

The arc runner 650 guides a generated arc so that the arc flows toward the grid 620. By the arc guide 640, it is possible to prevent the generated arc from advancing to one wall of the cover unit 100 beyond the grid 620. Accordingly, it is possible to prevent the cover unit 100 from being damaged by the generated arc.

(2) Description of the Circuit Breaking Unit 300

Figure 28:
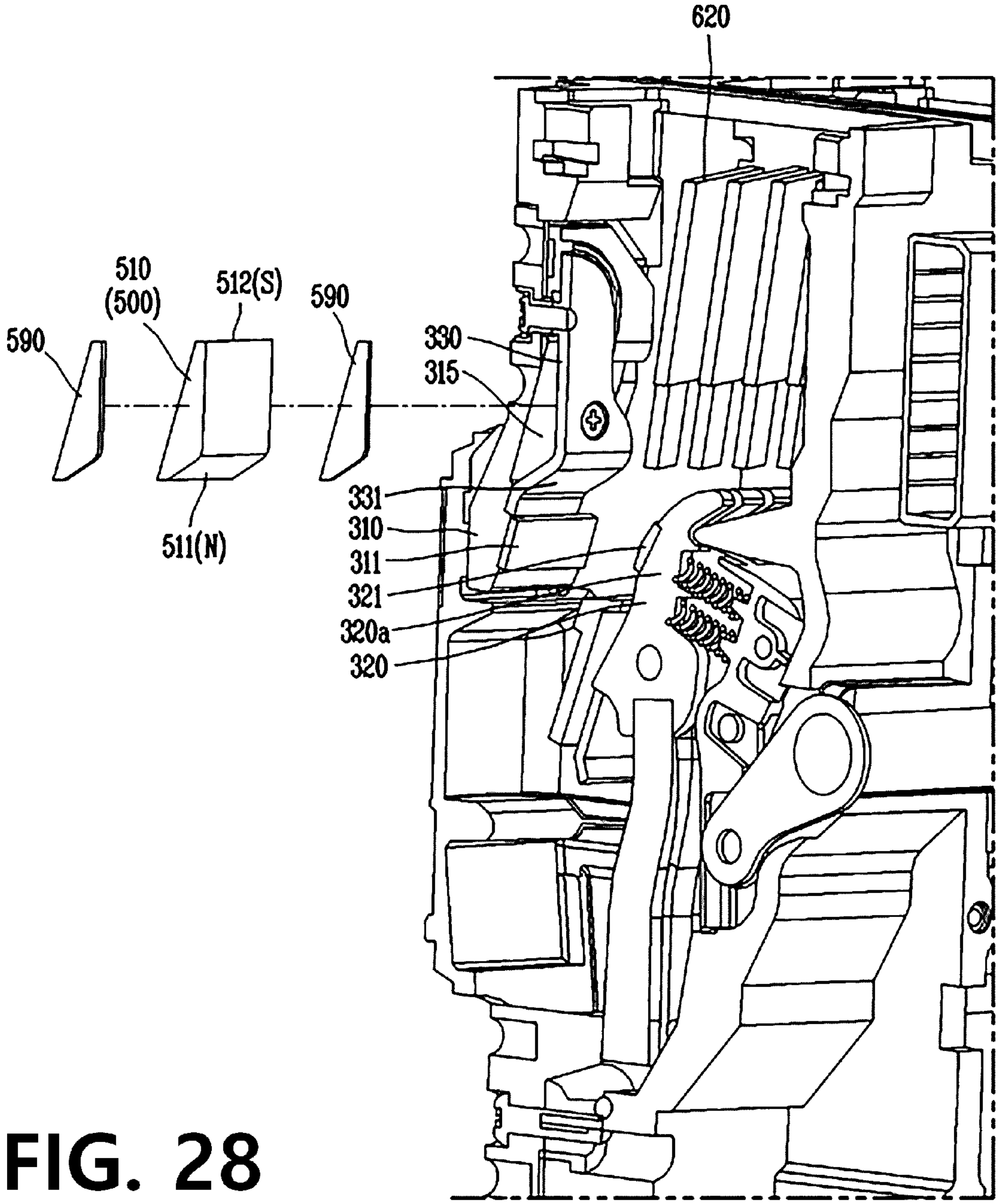
FIG. 28 is a perspective view illustrating another exemplary embodiment of a circuit breaking unit provided in the air circuit breaker of FIG. 1.
Figure 29:
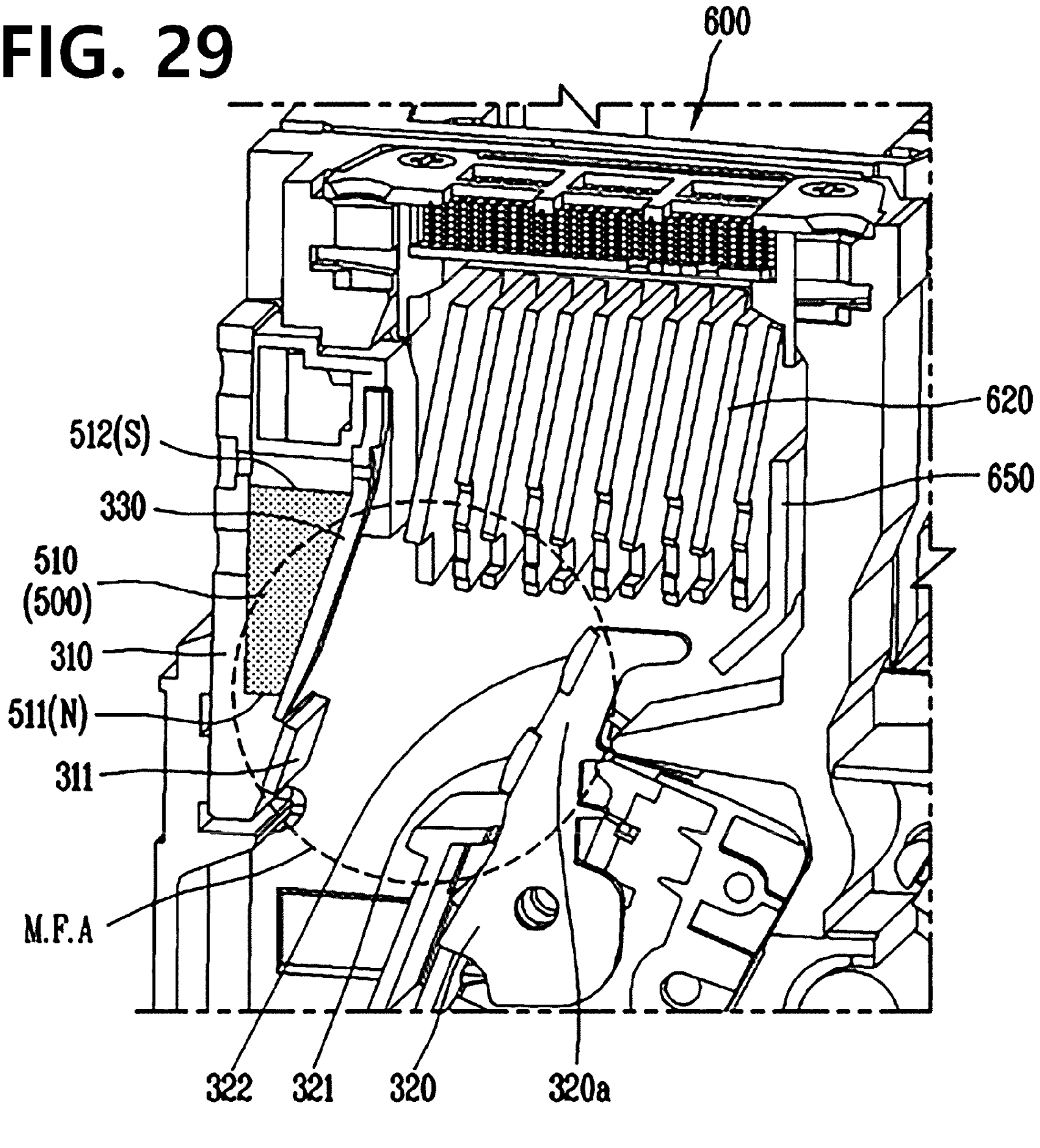
FIG. 29 is a perspective view illustrating yet another exemplary embodiment of a circuit breaking unit provided in the air circuit breaker of FIG. 1.
Figure 30:
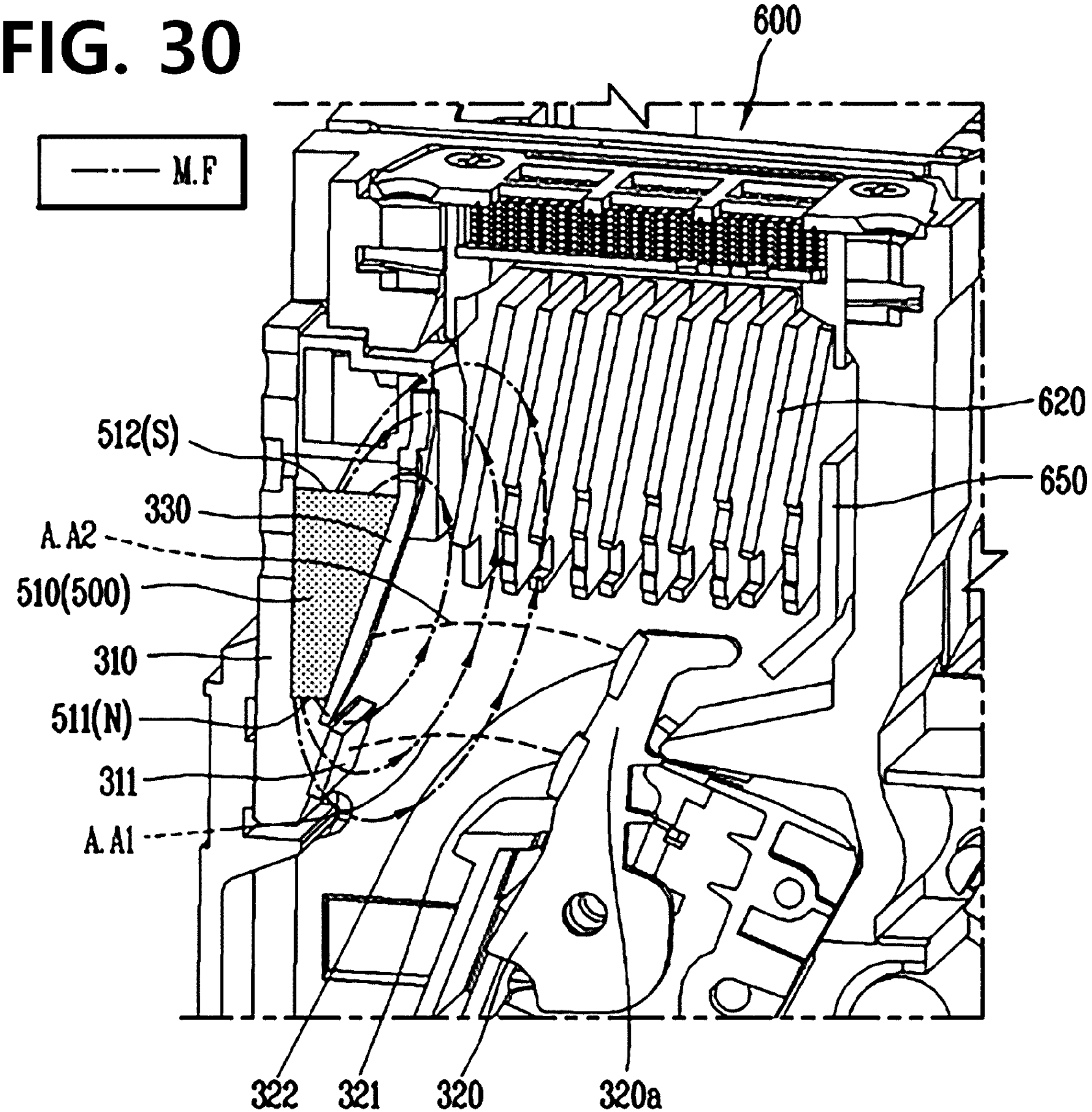
FIG. 30 is a view for explaining a magnetic field formed by a magnet unit in the circuit breaking unit of FIG. 28.

Referring to FIGS. 28 to 30, the circuit breaking unit 300 according to the present embodiment may further include a runner 330 and a magnet unit 500.

A fixed contact 311 is disposed at the lower end of the fixed contact terminal 310 which extends upward. Specifically, as shown in FIGS. 28 and 24, the fixed contact 311 is disposed at the lower end of the fixed contact terminal 310, and the fixed contact terminal 310 extends upward and is disposed to cover at least a portion of the front surface portion of the arc extinguishing unit 600.

The fixed contact terminal 310 extends upward and, as shown in FIG. 28, may extend toward the low runner 330 and the arc extinguishing unit 600 at a predetermined angle.

As shown in FIG. 29, the low runner 330 extends at a predetermined angle in a direction toward the arc extinguishing unit 600, so that the separation distance between the low runner 330 and the fixed contact terminal 310 may increase toward the upper side of the low runner 330.

Meanwhile, the low runner 330 may be disposed obliquely toward the arc extinguishing unit 600 above the fixed contact 311. Specifically, as shown in FIG. 29, the low runner 330 may be disposed obliquely toward the arc extinguishing unit 600 above the fixed contact 311.

The low runner 330 may guide an arc so that the arc generated when the fixed contact 311 and the movable contact 321 are in contact with each other and spaced apart may be guided toward the grid 620.

The low runner 330 may be formed of a conductive material. This is to guide the arc effectively by applying an attractive force to the flowing arc. In an embodiment, the low runner 330 may be formed of copper, iron, or an alloy including the same.

The low runner 330 extends toward the grid 620 by a predetermined length. In an embodiment, the low runner 330 may extend adjacent to the grid 620 located closest to the fixed contact 311.

A space part 315 may be formed between the low runner 330 and the fixed contact terminal 310. Specifically, referring to FIG. 28, a space part 315 is formed between the low runner 330 and the fixed contact terminal 310. The magnet unit 500 is disposed in the space part 315 formed between the low runner 330 and the fixed contact terminal 310. Specifically, as shown in FIG. 28, the magnet 510 of the magnet unit 500 is fitted and disposed into the space part 315 formed between the low runner 330 and the fixed contact terminal 310.

The magnet unit 500 may be formed to fill the entire space part 315 formed between the low runner 330 and the fixed contact terminal 310.

In another embodiment, the magnet unit 500 may be formed such that a portion of the space part 315 between the low runner 330 and the fixed contact terminal 310 is empty. Specifically, when the space part 315 is formed in a shape other than a rectangular hexagon, the magnet 510 filled in the space part 315 may be formed in a rectangular hexagon shape. Accordingly, an empty space may be partially formed in the space part 315, filled with the magnet 510, between the low runner 330 and the fixed contact terminal 310.

Meanwhile, the magnet unit 500 may further include a magnet 510 disposed on the rear surface of the low runner 330 and an insulating part 590 disposed to cover an exposed surface between the magnet 510 and the low runner 330.

Specifically, as shown in FIG. 28, an insulating part 590 may be further included to surround both sides of the magnet 510 fitted into the space part 315.

The insulating part 590 accommodates the magnet 510 inside. Specifically, it prevents the magnet 510 accommodated in the space part 315 from being electrically connected to the outside. Accordingly, the insulating part 590 may protect the magnet 510 from an arc.

In addition, the insulating part 590 is coupled to the fixed contact terminal 310 and/or the low runner 330 to allow the magnet 510 to be stably coupled to the space part 315. The insulating part 590 may extend left and right and/or up and down depending on the length of the low runner 330 and the length of the magnet 510.

The insulating part 590 may be formed of a heat-resistant material. This is to prevent the insulating part 590 and the magnet 510 accommodated inside the insulating part 590 from being damaged by a high-temperature and high-voltage arc. In an embodiment, the magnet 510 may be formed of synthetic resin or reinforced plastic.

The magnet unit 500 forms a magnetic field (M.F) between the fixed contact 311 and the movable contact 321 so as to guide the path of an arc generated when the fixed contact 311 and the movable contact 321 are separated, to the outside.

Specifically, referring to FIG. 29, the magnetic field area M.F.A formed by the magnet unit 500 may be between the fixed contact 311 and/or the low runner 330 and the movable contact 321. However, this is only an area set up to help to understand. That is, it means a space in which the magnetic field M.F formed by the magnet unit 500 directly affects the arc in the path where the arc is formed.

The magnetic field M.F can affect where the magnetic force passes. Therefore, the magnetic field M.F formed by the magnet unit 500 may also affect the grid 620, the side plate 610, or the cover of the grid 620.

Meanwhile, an arc-generation area may be defined. Since the fixed contact 311 and the movable contact 321 are spaced apart, and an arc is highly likely to be generated along the path along which the movable contact 321 is moved, this may be referred to as an arc-generation area.

In the present embodiment, the arc-generation area refers to a first arc-generation area A.A1 and a second arc-generation area A.A2. The low runner 330 may play the same role as the fixed contact 311 in relation to the protruding contact 322. However, an arc is generated at a contact that is later spaced apart.

In this case, the separation between the protruding contact 322 and the low runner 330 occurs later than the separation between the fixed contact 311 and the movable contact 321. In other words, the separation between the protruding contact 322 and the low runner 330 occurs later than the separation between the fixed contact 311 and the movable contact 321.

Therefore, the arc is generated not in the first arc-generation area A.A1 but in the second arc-generation area A.A2.

A magnet 510 includes a first surface 511 and a second surface 512. The magnet 510 includes a first surface 511 magnetized to the N pole and a second surface 512 magnetized to the S pole, disposed on opposite sides of each other, and the first surface 511 may be disposed in a direction adjacent to the fixed contact 311.

Specifically, referring to the drawings, the first surface 511 magnetized to the N pole may be disposed toward the lower side, and the second surface 512 magnetized to the S pole may be disposed toward the upper side.

Thus, the direction of the magnetic field M.F. may be formed in a direction in which lines of magnetic force come out from the first surface 511 and enter the second surface 512.

Figure 31:
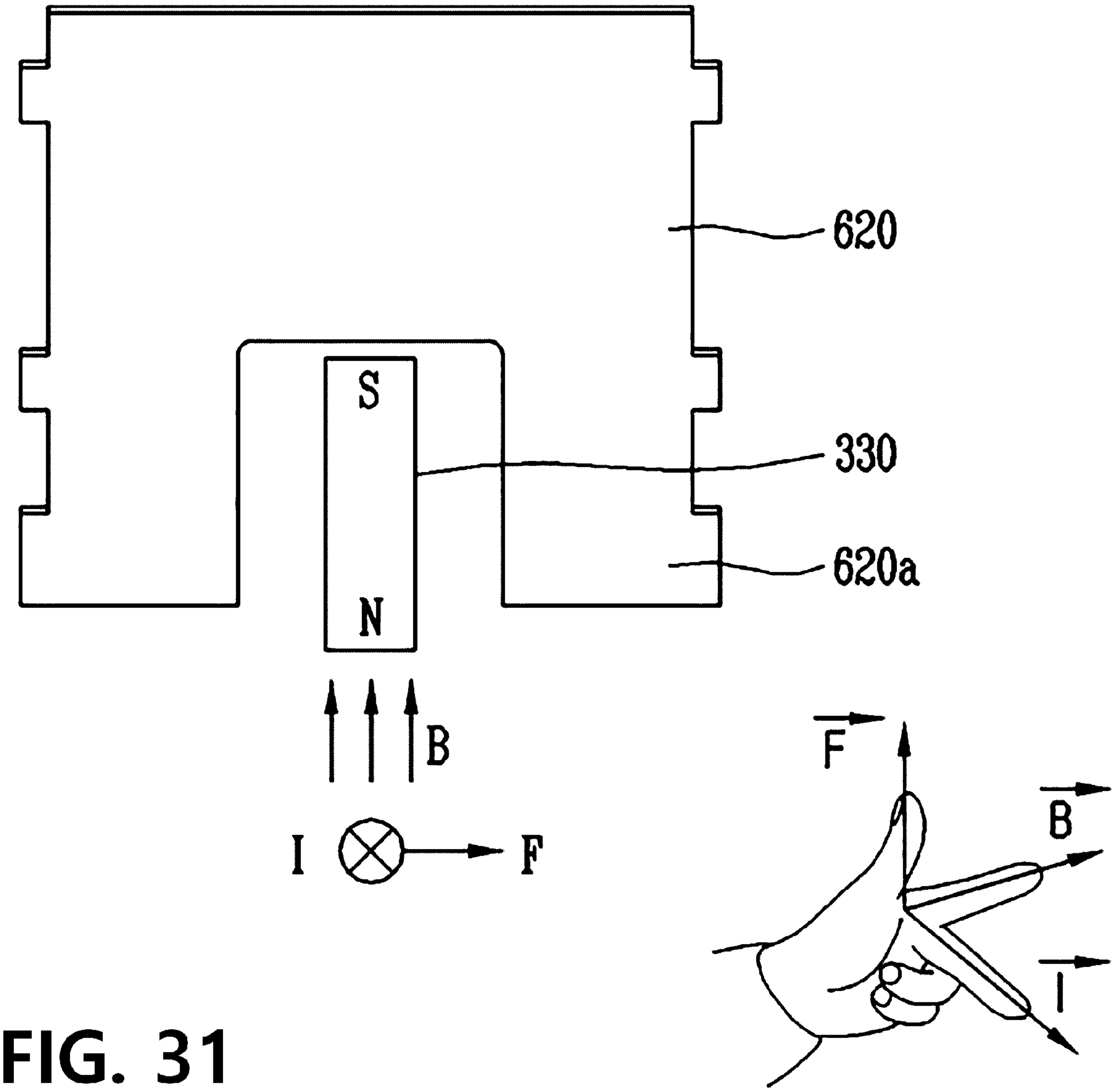
FIGS. 31 and 32 are views for explaining the direction of the force applied to the arc by the magnetic field formed in the magnet unit according to the direction of the current of the arc generated when the movable contact and the fixed contact are separated.
Figure 32:
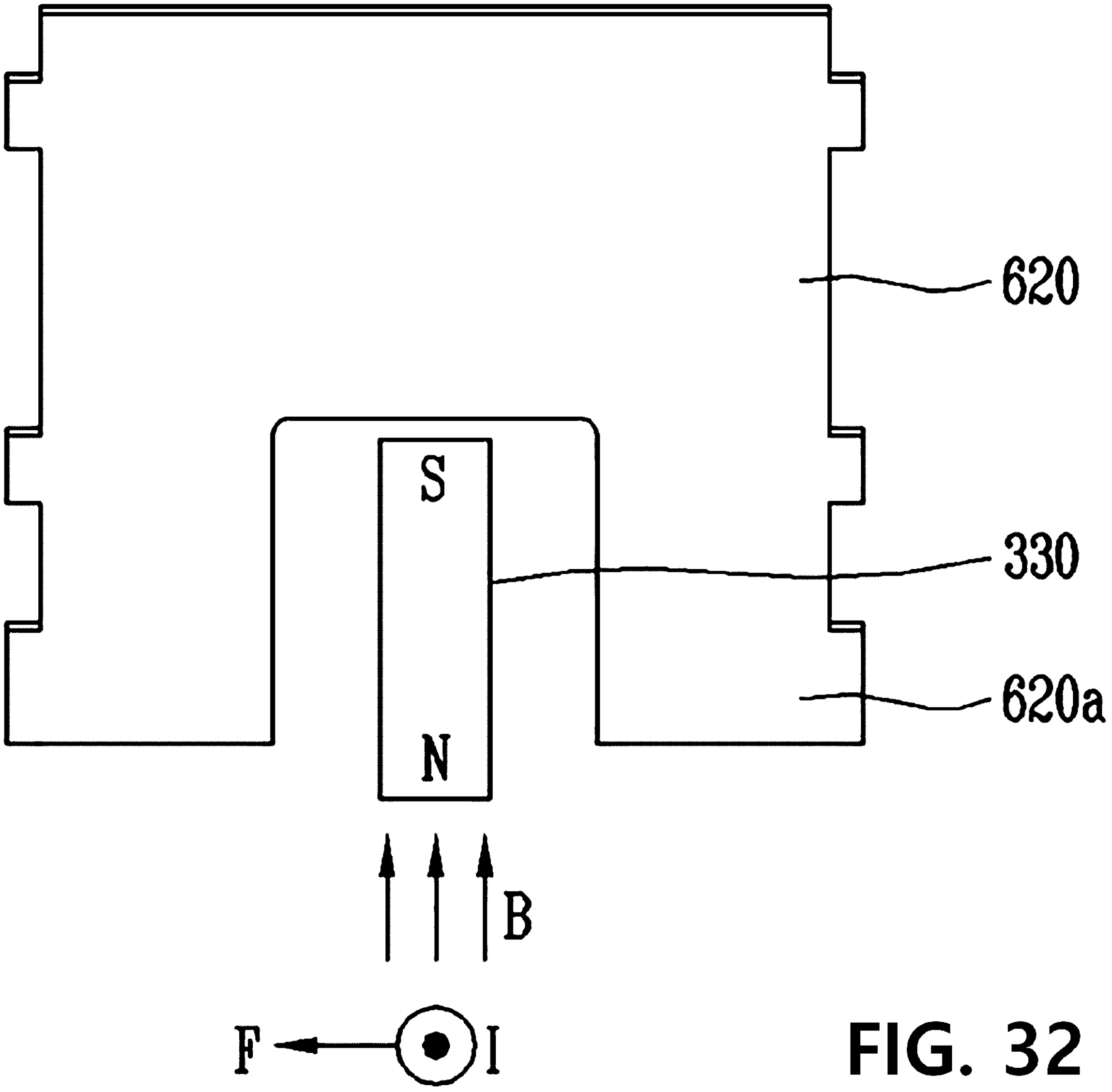

Specifically, referring to FIGS. 30 to 32, the direction of the magnetic field M.F. may be formed in a direction from the bottom to the top in the arc-generation area.

Through this arrangement, the magnetic field M.F applied to the magnetic field area M.F.A generated by the magnet unit 500 may be directed upward.

In addition to the above-described embodiments, the magnet 510 may be made to be disposed in the space part 315 when the fixed contact terminal 310 obliquely extends toward the arc extinguishing unit 600 and the low runner 330 obliquely extends toward the arc extinguishing unit 600.

Meanwhile, the circuit breaking unit 300 according to an embodiment of the present disclosure may further include a movable contact terminal 320 and a protruding contact 322.

The movable contact terminal 320 may include a movable contact terminal extension portion 320*a* in which the movable contact 321 is disposed and at least a portion thereof extends upward. Specifically, referring to FIG. 29, at least a portion of the movable contact terminal 320 may extend upward.

(3) Description of the Arc-Guided Path A.P According to the Present Embodiment

Referring to FIGS. 30 to 32, an arc-guided path A.P according to an embodiment of the present disclosure will be described.

Referring to FIG. 30, in the magnetic field M.F, lines of magnetic force run from the first surface 511 to the second surface 512 of the magnet 510. That is, the direction of the magnetic field M.F in the first arc-generation area A.A1 and the second arc-generation area A.A2 is from bottom to top.

Referring to FIG. 31, when the current (arc) is formed in the direction of entering toward the paper, the direction of the electromagnetic force applied to the arc is to the right.

Specifically, when considering the direction of the electromagnetic force, the direction can be explained by Fleming's left-hand rule. When you point the third finger in the direction of the current (I) and the second finger in the direction of the magnetic field (B), the direction of the thumb is the direction of the electromagnetic force (F). Here, the angle between each finger should be a right angle.

According to Fleming's left-hand rule, the direction of the electromagnetic force is to the right when the current is in the direction of entering toward the paper. That is, the arc-guided path A.P is formed toward the leg 621 of the grid 620. Accordingly, the arc can be applied to the grid 620 and quickly extinguished.

And referring to FIG. 32, when the current (arc) is formed in the direction of coming out of the paper, the direction of the electromagnetic force applied to the arc is to the left.

According to Fleming's left-hand rule, when the current comes out of the paper and the magnetic field M.F. is directed upward, the direction of the electromagnetic force is to the left. That is, the arc-guided path A.P is formed toward the leg 621 of the grid 620 disposed on the opposite side of the grid leg 621 in the embodiment of FIG. 31 described above. Accordingly, the arc can be applied to the grid 620 and quickly extinguished.

That is, according to an embodiment of the present disclosure, electromagnetic force is applied toward the leg 621 of the grid 620 in both cases where the current (arc) is formed in a direction of entering toward the paper or in a direction of coming out of the paper. That is, an arc-guided path A.P is formed toward the leg 621 of the grid 620 in both cases where the current (arc) is formed in a direction of entering toward the paper or in a direction of coming out of the paper.

Therefore, according to an embodiment of the present disclosure, the arc can be quickly extinguished by applying an arc to the grid 620.

Meanwhile, the grid 620 may extend to have a length corresponding to the central portion of the magnet unit 500. That is, the grid 620 may extend to correspond to the central portion of the magnet 510 of the magnet unit 500. Specifically, the leg of the grid 620 may correspond to the central portion of the magnet 510 of the magnet unit 500 or may extend further downward. Therefore, the arc in which the arc-guided path A.P is formed by the electromagnetic force can be applied to the grid 620 more easily.

In addition, in the case of the second arc-generation area A.A2 where current is formed, an arc may be generated between the protruding contact 322 and the low runner 330. In this case, compared to the first arc-generation area A.A1 where an arc is generated between the movable contact 321 and the fixed contact 311, the arc is generated in the area moved toward the grid 620. That is, since the arc is generated in an area closer to the grid 620, the probability that the arc is applied to the grid 620 is higher, and accordingly, the arc extinguishing can occur more quickly.

The arc generated in the circuit breaking unit according to an embodiment of the present disclosure is subjected to electromagnetic force in directions toward both sides of the grid 620 provided in the arc extinguishing unit 600. Therefore, the arc-guided path A.P is formed to face peaks formed on both sides of the grid 620, so that the arc can effectively flow to the arc extinguishing unit 600.

As described, although the above has been described with reference to preferred embodiments of the present disclosure, it will be understood that those skilled in the art can variously modify and change the present disclosure without departing from the idea and scope of the present disclosure described in the claims below.

What is claimed is:

1. A circuit breaking unit, comprising:

a fixed contact terminal having a fixed contact disposed at a first end and extending in a first direction away from the fixed contact toward a second end;

a movable contact, configured to move toward or away from the fixed contact;

a runner disposed extending in the first direction from the fixed contact, wherein a first end of the runner is coupled to the fixed contact terminal, and a second end of the runner, opposite to the first end, is spaced apart from the fixed contact terminal; and a magnet unit disposed between the runner and the fixed contact terminal and forming a magnetic field between the fixed contact and the movable contact to guide a path of an arc generated when the fixed contact and the movable contact are separated, wherein the runner is shaped to define a gradually expanding space for the magnet unit between the runner and the fixed contact terminal, such that a distance away between the runner the fixed contact terminal increases in the first direction.

2. The circuit breaking unit of claim 1, wherein the runner comprises a bent part formed between both ends and configured to change an angle between the runner and the fixed contact terminal.

3. The circuit breaking unit of claim 1, wherein the magnet unit is shaped to fill a space formed between the runner and the fixed contact terminal.

4. The circuit breaking unit of claim 3, wherein the magnet unit comprise a plurality of magnets segmented into a plurality of segments, wherein the plurality of magnets is formed by stacking magnets of the plurality of magnets.

5. The circuit breaking unit of claim 3, wherein the magnet unit protrudes and extends toward at least one direction among both side directions of the runner.

6. The circuit breaking unit of claim 5, wherein the magnet unit protrudes and extends from a rear surface of the runner toward the movable contact.

7. The circuit breaking unit of claim 1, wherein the magnet unit comprise a first surface magnetized to a north pole and a second surface magnetized to a South pole disposed on opposite surfaces to each other, wherein the first surface is disposed in a direction adjacent to the fixed contact.

8. The circuit breaking unit of claim 1, wherein the magnet unit further comprises:

a magnet disposed on a surface of the runner; and an insulating part disposed to surround an exposed surface between the magnet and the runner.

9. The circuit breaking unit of claim 1, wherein the fixed contact terminal extends in the first direction to form a predetermined angle toward the runner.

10. The circuit breaking unit of claim 1, further comprising:

a movable contact terminal on which the movable contact is disposed, and comprising an extension part in which at least a portion of an area extends in the first direction; and a protruding contact spaced apart from the movable contact and disposed on the extension part.

11. The circuit breaking unit of claim 10, wherein the protruding contact is in contact with the runner when the movable contact is disposed in a state of being in contact with the fixed contact.

12. An air circuit breaker, comprising:

an arc extinguishing unit comprising a plurality of side plates and a grid coupled between the plurality of side plates; and a circuit breaking unit disposed adjacent to the arc extinguishing unit, wherein the circuit breaking unit comprises:

a fixed contact terminal having a fixed contact disposed at a first end and extending in a first direction away from the fixed contact toward a second end;

a movable contact, configured to move toward or away from the fixed contact;

a runner disposed extending in the first direction from the fixed contact, wherein a first end of the runner is coupled to the fixed contact terminal, and a second end of the runner, opposite to the first end, is spaced apart from the fixed contact terminal; and a magnet unit disposed between the runner and the fixed contact terminal and forming a magnetic field between the fixed contact and the movable contact to guide a path of an arc generated when the fixed contact and the movable contact are separated, wherein the runner is shaped to define a gradually expanding space for the magnet unit between the runner and the fixed contact terminal, such that a distance away between the runner the fixed contact terminal increases in the first direction.

13. The air circuit breaker of claim 12, wherein the grid extends to have a length corresponding to a central portion of the magnet unit.

14. The air circuit breaker of claim 12, wherein the grid comprises a grid leg extending in a second direction, opposite to the first direction, from both ends in a width direction so that an induced magnetic field is formed by an arc generated when the fixed contact and the movable contact are spaced apart.

15. The air circuit breaker of claim 14, wherein the grid leg extends adjacent to an end of a side plate of the plurality of side plates.

16. The air circuit breaker of claim 15, wherein the grid leg comprises:

a first grid leg extending from one end of the grid in the width direction; and a second grid leg extending opposite the first grid leg, wherein the first grid leg and the second grid leg have a same width.

17. The air circuit breaker of claim 16, further comprising:

a protruding contact extending in the first direction from the movable contact, wherein the grid leg is formed to surround the protruding contact from both sides.

18. The air circuit breaker of claim 17, wherein the same width of the first grid leg and the second grid leg is greater than a length of an air gap, which is a distance between the first grid leg or the second grid leg and the protruding contact.

19. The air circuit breaker of claim 14, wherein the magnet unit is shaped to fill a space formed between the runner and the fixed contact terminal.

20. The air circuit breaker of claim 14, wherein the magnet unit comprise a first surface magnetized to a North pole and a second surface magnetized to a South pole disposed on opposite surfaces to each other, wherein the first surface is disposed in a direction adjacent to the fixed contact.

21. The air circuit breaker of claim 14, wherein the fixed contact terminal extends in the first direction to form a predetermined angle toward the runner.

22. The air circuit breaker of claim 14, wherein in a trip state in which the fixed contact and the movable contact are spaced apart, a magnetic field area in which electromagnetic force is applied to a generated arc is formed in a first space between the runner and the movable contact and in a second space in a second direction, opposite to the first direction, relative to the grid.

23. The air circuit breaker of claim 22, wherein a magnetic field produced by the magnet unit and an induced magnetic field by the grid leg induced by a generated arc are applied to the magnetic field area.

* * * * *